(12) United States Patent
Dent

(10) Patent No.: US 6,934,317 B1
(45) Date of Patent: Aug. 23, 2005

(54) SYSTEMS AND METHODS FOR COMMUNICATING SPREAD SPECTRUM SIGNALS USING VARIABLE SIGNAL CONSTELLATIONS

(75) Inventor: Paul W. Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 858 days.

(21) Appl. No.: 09/686,304

(22) Filed: Oct. 11, 2000

(51) Int. Cl.$^7$ ................................................ H04B 1/69
(52) U.S. Cl. ........................ 375/140; 375/146; 375/147
(58) Field of Search ................................ 375/130, 135, 375/136, 140, 146, 147, 133, 141, 265, 341, 295, 286, 285; 370/311

(56) References Cited

U.S. PATENT DOCUMENTS

| | | | |
|---|---|---|---|
| 5,048,059 A | 9/1991 | Dent | 375/94 |
| 5,151,919 A | 9/1992 | Dent | 375/1 |
| 5,218,619 A | 6/1993 | Dent | 375/1 |
| 5,239,557 A | 8/1993 | Dent | 375/1 |
| 5,305,349 A | 4/1994 | Dent | 375/1 |
| 5,377,183 A | 12/1994 | Dent | 370/18 |
| 5,572,552 A | 11/1996 | Dent et al. | 375/343 |
| 5,636,251 A * | 6/1997 | Citta et al. | 375/341 |
| 5,831,977 A | 11/1998 | Dent | 370/335 |
| 5,862,173 A | 1/1999 | Dent | 375/206 |
| 5,903,555 A * | 5/1999 | Wildauer et al. | 370/342 |
| 5,923,711 A * | 7/1999 | Willming | 375/287 |
| 5,931,893 A | 8/1999 | Dent et al. | 708/422 |
| 5,944,774 A | 8/1999 | Dent | 708/517 |
| 6,144,651 A * | 11/2000 | Rinchiuso et al. | 370/335 |
| 6,205,130 B1 * | 3/2001 | DeJaco | 370/335 |
| 6,215,762 B1 | 4/2001 | Dent | 370/208 |
| 6,226,320 B1 * | 5/2001 | Hakkinen et al. | 375/225 |
| 6,307,840 B1 * | 10/2001 | Wheatley et al. | 370/252 |

(Continued)

FOREIGN PATENT DOCUMENTS

| | | |
|---|---|---|
| WO | WO 99/39472 | 8/1999 |
| WO | WO 99/45660 | 9/1999 |

OTHER PUBLICATIONS

Annex to Form PCT/ISA/206, Communication Relating to the Results of the Partial International Search, PCT/US01/26218, May 31, 2002.

(Continued)

*Primary Examiner*—Emmanuel Bayard
(74) *Attorney, Agent, or Firm*—Myers Bigel Sibley & Sajovec PA

(57) ABSTRACT

According to embodiments of the invention, a communications system includes an error correction encoder that error correction encodes a bitstream according to an error correction code. The system also includes a variable symbol generator that generates a symbol according to a selected one of a plurality of selectable signal constellations from a group of bits of the error correction encoded bitstream. The system further includes a spreader that spreads the symbol according to a spreading code, and a transmitter that transmits the spread symbol in a communications medium. Preferably, the plurality of selectable signal constellations includes at least two signal constellations of different order. In other embodiments, the error correction encoder includes a variable error-correction encoder that encodes the bitstream according to a selected error correction code of a plurality of selectable error correction codes. In still other embodiments, the spreader includes a variable spreader that spreads the symbol according to a selected spreading code of a plurality of selectable orthogonal spreading codes including at least two spreading codes of different lengths. A controller may select the error correction code used by the variable error correction encoder, the signal constellation used by the variable symbol generator, and the spreading code used by the variable spreader to provide a desired information transmission rate for the bitstream. Related methods are also described.

95 Claims, 20 Drawing Sheets

U.S. PATENT DOCUMENTS

| | | | | |
|---|---|---|---|---|
| 6,324,209 | B1 * | 11/2001 | Li et al. ..................... | 375/146 |
| 6,421,395 | B1 * | 7/2002 | Wei ............................ | 375/265 |
| 6,438,156 | B1 * | 8/2002 | Ghobrial et al. ............ | 375/148 |
| 6,449,002 | B1 * | 9/2002 | Markman et al. ............ | 348/21 |
| 6,480,521 | B1 * | 11/2002 | Odenwalder et al. ....... | 375/130 |
| 6,498,789 | B1 * | 12/2002 | Honda ........................ | 370/342 |
| 6,519,292 | B1 * | 2/2003 | Sakoda et al. .............. | 375/295 |
| 6,553,535 | B1 * | 4/2003 | Asada et al. ................ | 714/777 |
| 6,690,739 | B1 * | 2/2004 | Mui ........................... | 375/265 |

OTHER PUBLICATIONS

Robertson, et al., "Bandwidth–Efficient Turbo Trellis–Coded Modulation Using Punctured Component Codes," IEEE Journal on Selected Areas In Communications, vol. 16, No. 2, 1998, pp. 206–218.

Franz et al., "Concatenated Decoding with a Reduced–Search BCJR Algorithm," IEEE Journal on Selected Areas In Communications, vol. 16, No. 2, 1998, pp. 186–195.

Riedel, Sven, "Symbol–by–Symbol MAP Decoding Algorithm for High–Rate Convolutional Codes that Use Reciprocal Dual Codes," IEEE Journal on Selected Areas In Communications, vol. 16, No. 2, 1998, pp. 175–185.

Benedetto et al., "Guest Editorial Concatenated Coding Techniques and Iterative Decoding: Sailing Toward Channel Capacity," IEEE Journal on Selected Areas In Communications, vol. 16, No. 2, 1998, pp. 137–139.

Frey et al., "Early Detection and Trellis Splicing: Reduced–Complexity Iterative Decoding," IEEE Journal on Selected Areas In Communications, vol. 16, No. 2, 1998, pp. 153–159.

Komulainen et al., "Performance Evaluation of Superorthogonal Turbo Codes in AWGN and Flat Rayleigh Fading Channels," IEEE Journal on Selected Areas In Communications, vol. 16, No. 2, 1998, pp. 196–205.

Balachandran et al.., "Mismatched Decoding of Intersymbol Interference Using a Parallel Concatenated Scheme," IEEE Journal on Selected Areas In Communications, vol. 16, No. 2, 1998, pp. 255–259.

Viterbi, Andrew, "An Intuitive Justification and a Simplified Implementation of the MAP Decoder for Convoluation Codes," IEEE Journal on Selected Areas In Communications, vol. 16, No. 2, 1998, pp. 260–264.

Lucas et al., "On Iterative Soft–Decision Decoding of Linear Binary Block Codes and Product Codes," IEEE Journal on Selected Areas In Communications, vol. 16, No. 2, 1998, pp. 276–296.

Kschischang, Frank R., "Iterative Decoding of Compound Codes by Probability Propagation in Graphical Models," IEEE Journal on Selected Areas In Communications, vol. 16, No. 2, 1998, pp. 219–230.

Benedetto et al., "Analysis, Design, and Iterative Decoding of Double Serially Concatenated Codes with Interleavers," IEEE Journal on Selected Areas In Communications, vol. 16, No. 2, 1998, pp. 231–244.

Battail, Gerard, "A Conceptual Framework for Understanding Turbo Codes," IEEE Journal on Selected Areas In Communications, vol. 16, No. 2, 1998, pp. 245–254.

McEliece, et al., "Turbo Decoding as an Instance of Pearl's "Belief Propagation" Algorithm", IEEE Journal on Selected Areas In Communications, vol. 16, No. 2, 1998, pp. 140–152.

Hall et al., "Design and Analysis of Turbo Codes on Rayleigh Fading Channels," IEEE Journal on Selected Areas In Communications, vol. 16, No. 2, 1998, pp. 160–174.

Anderson et al., "Tailbiting MAP Decoders," IEEE Journal on Selected Areas In Communications, vol. 16, No. 2, 1998, pp. 297–302.

Herzberg, Hanan, "Multilevel Turbo Coding with Short Interleavers," IEEE Journal on Selected Areas In Communications, vol. 16, No. 2, 1998, pp. 303–309.

Marsland et al., "Multiple Differential Detection of Parallel Concatenated Convolutional (Turbo) Codes in Correlated Fast Rayleigh Fading," IEEE Journal on Selected Areas In Communications, vol. 16, No. 2, 1998, pp. 265–275.

* cited by examiner

16QAM with non-equal power division between bit pairs

SYSTEMS AND METHODS FOR COMMUNICATING SPREAD SPECTRUM SIGNALS USING VARIABLE SIGNAL CONSTELLATIONS

BACKGROUND OF THE INVENTION

The present invention relates to communications systems and methods, and more particularly, to spread spectrum communications systems and methods.

Wireless communications systems are commonly employed to provide voice and data communications to multiple recipients. Several different types of access techniques are conventionally used to provide such wireless services. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. More recently developed digital wireless systems typically utilize different multiple access techniques such as time division multiple access (TDMA) and/or code division multiple access (CDMA) to provide increased spectral efficiency. In TDMA systems, such as those conforming to the GSM or TIA/EIA-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional CDMA systems typically code information to be transmitted and map the coded bits in pairs to QPSK symbols. The QPSK symbols are then spread by a factor of M to a chiprate and bandwidth determined for the CDMA system using one of a set of M, M-symbol orthogonal spreading codes.

In such conventional systems, an increase in the coded bitrate by a factor of two could be accomplished by reduction of M by a factor of two to obtain half the number of orthogonal codes of half the length and twice the information rate. This so-called variable-rate, orthogonal coding is specified for the 3rd generation cellular system known as UMPTS or IMT2000. The number of higher bitrate accesses may be limited by the number of available orthogonal codes, even if not limited by the available transmission power or signal-to-noise ratio.

In other conventional systems, higher data rates can be obtained for a given user by allocating him more than one of the available codes, the so-called "multi-code" solution. However, this typically reduces the number of codes available to allocate to other users, and may limit the number of simultaneous users served by the system.

FIG. 1 illustrates a conventional use of variable-rate Walsh-Hadamard codes orthogonal codes for a CDMA system. The structure of these Walsh-Hadamard codes begins with a pair of elementary two-bit codes 11 and 10. These codes are orthogonal because half the bits agree and half the bits differ, giving a cross correlation of zero.

The two, 2-bit codes may be expanded into four mutually orthogonal 4-bit codes by taking each 2-bit code in turn and expanding it to two, 4-bit codes, the first of which comprises the 2-bit code repeated, and the second comprises the two bit code repeated with the repeat inverted (complemented), thus assuring that half the bits agree and half the bits disagree between the two new 4-bit codes. Likewise, each 4-bit code can be expanded into two 8-bit codes, by repeating the four bit code twice for one 8-bit code, the repeat being inverted for a second 8-bit code, and the process may continue indefinitely to obtain a set of any number of orthogonal codes.

Binary traffic information is transmitted by transmitting an assigned code to represent a "1" or its inverse to represent a "0." One information bit is thus conveyed per 16 "chips" in the case of a 16-bit orthogonal code being used, that is the information rate is $\frac{1}{16}$th the chip rate. The penalty of using longer codes, of which a greater number are available, is thus a lower data rate.

If it is desired to construct orthogonal codes of length other than a power of two, Fourier sequences may alternatively be used as described in U.S. patent application Ser. No. 08/898,392, entitled "COMMUNICATION SYSTEM AND METHOD WITH ORTHOGONAL BLOCK CODING", filed Jul. 22, 1997, in U.S. patent application Ser. No. 09/340,907, entitled "MULTI-CARRIER ORTHOGONAL CODING", filed Jun. 28, 1999, and in U.S. patent application Ser. No. 09/082,722, entitled "PARTIALLY BLOCK-INTERLEAVED CDMA CODING AND DECODING", filed May 21, 1998.

Fourier sequences of a composite length such as 2×3×5 may be constructed to allow variable rate orthogonal codes for changing the data rate in successive steps of 5, 3 and 2, i.e. in steps equal to the factors of the composite length, but restricted to the order in which the factors are employed to construct the code. For example, if the code is constructed with Fourier sequences of length 5×2×3, then the successive steps in which the data rate may be changed are factors of 3 then 2 then 5, instead of 5 then 3 then 2 as with the first example.

Future mobile communications services will probably provide for a variety of different types of traffic, including high-penetration short message service, which is probably will be the lowest bitrate service and probably will use a long code, such as 1024 chips, and digitized voice, which is likely to be the next lowest bitrate service and probably will use a shorter code, for example, 256 or 128 chips. The highest bitrate service could be mobile Internet or a "videophone" service, which might use only 16 or even 4-chip codes, When a shorter code, such as 4 chips, is used for a high bitrate service, the two 8-bit codes which could have been derived from it by the expansion shown in FIG. 1 will typically not be used, in order to maintain orthogonality of transmission. In effect, the use of one 4-bit code can thus consumes the code space of two 8-bit codes or four 16-bit codes, and so forth.

A different 4-bit code that is not used for a high bitrate service can, however, be expanded to two 8-bit codes or beyond, to provide lower bitrate services. Because the latter are derived by repeating a 4-bit code that is orthogonal to the 4-bit code used for the high bitrate service, all of the lower bitrate signals are orthogonal to the high bitrate signal as well as to each other. Thus the technique of variable-rate orthogonal coding described above with reference to FIG. 1 can allow a mixture of traffic bitrates subject to each instance of a particular traffic bitrate denying two instances of traffic at half the bitrate, or four instances of traffic at ¼ the bitrate, and so on.

Thus, with many instances of high bitrate traffic, there may be a large loss in the number of codes available for low bitrate traffic, such as voice. Moreover, it may be commercially disadvantageous for an operator of wireless communications services to charge for high bitrate services at a level commensurate with the number of voice traffic signals thereby displaced. For example, a 1 MB/S Internet connection might displace 64, 16 kilobit voice signals that normally yield a revenue of 10¢/minute each; however, it would may be commercially infeasible for the operator to charge $6.40/minute for the Internet service that displaces these 64 voice signals.

At least one cellular system, known as GSM/EDGE, has recognized this economic dilemma and has proposed to use binary GMSK modulation for voice and 8-phase modulation for data, thus tripling the bitrate for data in comparison to voice. In this manner, the resource usage penalty in providing high bitrate services compared to voice services may be mitigated by a factor of at least 3. A potential disadvantage of using 8-psk modulation, however, is that an increase in transmitted power may be required to maintain a given transmission error rate, or an increase in transmission error rate may need to be tolerated. Higher layers of the packet protocols normally used for data transmission can tolerate and compensate for increased error rate by smart acknowledgement and retransmission strategies. However, these error mitigation techniques may not be desirable for voice services because of a desire to provide real-time transmission. Consequently, the cost of data services may be reduced by accepting variable transmission delay due to errors, which may be tolerable in many Internet applications, for example.

FIG. 2 illustrates a conventional CDMA system that uses QPSK modulation, which is a four-phase modulation conveying two bits per information symbol. In FIG. 2, information bits enter a turbo-encoder 10 that performs error correction coding and outputs coded bits. The number of coded bits is greater than the number of information bits by a factor in the region of 2–4, reflecting the rate of the code. The coded bits are separated into two streams by, for example, directing even-numbered bits to one output and odd-numbered bits to another output using switch 1. Each of the even or odd bits is then expanded by a CDMA spreading factor to provide a greater number of chips per second, using the same one of a set of orthogonal spreading codes for both the even and the odd bits. The even and odd bits and the corresponding even and odd chips produced by spreading 13 using assigned code 12 are destined to be transmitted using the cosine and sine or "I and Q" channels of a complex radio signal modulation, and so may be called "I-bits, Q-bits" and "I-chips, Q-chips" respectively. A pair of bits comprising an I-bit and a Q-bit, if the bit periods are synchronized, comprises a QPSK symbol, and a pair of I,Q chips comprises a QPSK symbol at the CDMA spread rate.

The I-chips are filtered before modulating a cosine radio carrier signal, and the Q-chips are filtered before modulating a sine carrier signal, in a quadrature modulator 16. Prior to modulation in modulator 16, however, the I and Q chip streams are scrambled by rotating the phase of the QPSK symbol or complex number it represents through either 0,90,180 or 270 degrees by complex-multiplication with a pseudorandom QPSK symbol stream from an I,Q code generator 15. This scrambling code is typically common to all transmitters in the CDMA system, so it typically does not destroy the mutual orthogonality between different assigned codes 12 used by different transmitters. The transmitter of FIG. 2, can use different length assigned codes (12) depending on the desired traffic bitrate.

A QPSK symbol steam comprises an I-bit of chip stream and a Q-bit or chip stream to transmit twice the data rate. This typically can be done with little or no penalty over a BPSK scheme because the I and the Q channels use respective cosine and sinewave carriers that are at right-angles to each other and do not interact. This is the basic (i.e. lowest traffic rate) modulation scheme typically used in a conventional CDMA system such as that illustrated in FIG. 2.

A typical receiver for signals transmitted by an apparatus such as that in FIG. 2 includes corresponding receiver processing blocks in reverse order. A quadrature demodulator receives the signal and reproduces I and Q sample streams. The I and Q sample streams are complex multiplied by the conjugate of the common code generator code to undo the scrambling phase rotations applied at the transmitter. The phase-unscrambled I and Q streams are then correlated with the assigned orthogonal code by multiplying successive samples by the bits of the code and summing over the code length. The resulting I-sums and Q-sums, now at the despread rate equal to the original coded bit rate from turbo-encoder 10 are processed by a turbo decoder to reconstruct the original information. Other refinements in CDMA receivers can include RAKE combining of multipath rays and other conventional techniques.

SUMMARY OF THE INVENTION

According to embodiments of the present invention, information bits to be transmitted are coded and interleaved to form coded bits for transmission. Coded bits are then assembled into groups of N bits and each group of N bits is then represented by a point in the complex plane selected from a set of two to the power N possible points, the set of points forming a signal constellation and a mapping from N-bit patterns to constellation points. Each complex point then multiplies a spreading code of M symbols at a time to form N chips of a CDMA signal. Successive complex points form successive blocks of CDMA chips which are either concatenated or block-interleaved to form a continuous CDMA signal which may be filtered prior to modulation and radio transmission. Different information signals form different CDMA signals using orthogonal spreading codes of M symbols and the different CDMA signals may be added to form multiple-user signals, which are filtered before modulation and transmission.

According to other embodiments of the present invention, a user desiring a higher bitrate can select a higher value of N rather than, as in the prior art, a lower value of M, thus preventing the number of orthogonal codes available from being reduced from N to M/2. The selection of a higher value of N can be done for example when it is not possible to select a lower value of M due to code non-availability.

In other embodiments of the invention, two lower-bitrate signals to be transmitted from a network station to different users can be combined into a higher bitrate signal by using a higher value of N, thus allowing two users to share a single one of the M orthogonal codes, thus economizing on the allocation of orthogonal codes. Optimum signal constellations may be provided which, together with allocating bits of the multi-bit symbols that are hardest to decode error free to the more favorably located user and bits that are more easily decoded error free to the less favorably located user, may provide improved capacity. According to other embodiments of the invention, the allocation of N and M and the grouping of different information signals to form a jointly coded transmission may be dependent on quality parameters of the transmission path from the network station to each user terminal and are chosen in order to control, e.g. maximize, capacity or transmission rate.

According to other embodiments of the present invention, a communications system for communicating with a plurality of terminals includes a network station. The system further includes a variable error correction encoder that error correction encodes respective bitstreams for respective ones of the plurality of terminals according to respective selected coding rates of a plurality of coding rates. A variable symbol generator maps respective ones of the error correction coded bitstreams to respective symbol streams according to respective signal constellations of a plurality of signal constellations of various orders. A variable spreader spreads the respective symbol streams according to respective orthogonal spreading codes of a plurality of mutually orthogonal spreading codes of various lengths. A transmitter transmits the spread symbol streams from the network station in a communications medium. A controller, operatively associated with the variable error correction encoder, the variable symbol generator and the variable spreader, selects respective combinations of coding rate, signal constellation and spreading code applied to the respective bitstreams such that the spread symbol streams transmitted from the network station are spread according to mutually orthogonal spreading codes.

In other embodiments of the present invention, the controller selects the respective combinations of coding rate, signal constellation and spreading codes applied to the respective bitstreams such that each of the bitstreams is transmitted at an information transmission rate that is greater than or equal to a predetermined information transmission rate and with a signal transmission quality that meets a predetermined criterion. In still other embodiments of the present invention, the controller selects the respective combinations of coding rate, signal constellation and spreading code applied to the respective bitstreams to maximize an information transmission rate for a selected terminal of the plurality of terminals. The controller may select the respective combinations of coding rate, signal constellation and spreading code applied to the respective bitstreams such that power for transmitting the plurality of spread symbol streams from the network station is less than a maximum total transmit power. The controller may also maximize an information transmission rate for the selected terminal while maintaining a mean transmit power for the plurality of transmitted spread symbol streams at less than a maximum mean transmit power.

According to other embodiments of the present invention, a communications system includes an error correction encoder that error correction encodes a bitstream according to an error correction code. The system also includes a variable symbol generator that generates a symbol from a group of bits of the error correction encoded bitstream according to a selected one of a plurality of selectable signal constellations. The system further includes a spreader that spreads the symbol according to a spreading code, and a transmitter that transmits the spread symbol in a communications medium. Preferably, the plurality of selectable signal constellations includes at least two signal constellations of different order.

The system may further include a controller, operatively associated with the variable symbol generator, which selects the signal constellation to provide a desired information transmission rate for the bitstream. The controller may select the signal constellation used by the variable symbol generator based on signal transmission quality.

According to still other embodiments of the present invention, the error correction encoder includes a variable error correction encoder that encodes the bitstream according to a selected error correction code of a plurality of selectable error correction codes. A controller may select the error correction code used by the variable error correction encoder and the signal constellation used by the variable symbol generator to provide a desired information transmission rate for the bitstream. For example, the controller may select the error correction code used by the error correction encoder and the signal constellation used by the variable symbol generator based on signal transmission quality.

According to still other embodiments of the present invention, the spreader includes a variable spreader that spreads the symbol according to a selected spreading code of a plurality of selectable orthogonal spreading codes including at least two spreading codes of different lengths. A controller may select the error correction code used by the variable error correction encoder, the signal constellation used by the variable symbol generator, and the spreading code used by the variable spreader to provide a desired information transmission rate for the bitstream. The controller may select the error correction code used by the error correction encoder, the signal constellation used by the variable symbol generator, and the spreading code used by the variable spreader based on signal transmission quality. For example, the controller may select the error correction encoding rate used by the variable error correction encoder, the signal constellation used by the variable symbol generator and the spreading code used by the variable spreader such that an information transmission rate for the bitstream is greater than or equal to a predetermined information transmission rate and a signal transmission quality for the bitstream meets a predetermined criterion.

According to other embodiments of the present invention, the bitstream includes a plurality of bitstreams. A variable error detection encoder error correction encodes respective ones of the plurality of bitstreams according to respective selected error correction codes of the plurality of selectable error correction codes. A variable symbol generator produces respective symbol streams from respective ones of the error correction encoded bitstreams according to respective selected signal constellations of the plurality of selectable signal constellations. A variable spreader spreads respective ones of the symbol streams according to respective selected spreading codes of the plurality of selectable spreading codes. A controller selects respective combinations of error correction code, signal constellation and spreading code applied to the respective bitstreams of the plurality of bitstreams such that an information transmission rate for a first bitstream exceeds a first minimum required information transmission rate associated with the first bitstream while an information transmission rate for a second bitstream is maintained at or above a second minimum required information transmission rate associated with the second bitstream. The controller may select respective combinations of error correction code, signal constellation and spreading code applied to the respective bitstreams of the plurality of bitstreams such that the information transmission rate for the first bitstream is maximized. The controller may further control respective power levels at which respective ones of the plurality of bitstreams are transmitted, and may select respective combinations of error correction code, signal constellation and spreading code applied to the respective bitstreams of the plurality of bitstreams such that the information transmission rate for the first bitstream is maximized while maintaining a desired transmit power level for the plurality of bitstreams.

According to other aspects of the present invention, a variable symbol generator produces respective symbols from the selected signal constellation from respective groups of bits of an encoded bitstream such that a first bit position of the successive groups of bits correlates to clusters of signal plane constellation points of the selected signal constellation and a second bit position of the successive groups correlates to relative positions within the clusters of constellation points. Means for determining respective first and second desired power levels for respective first and second recipients of information in respective ones of the first and second bit positions may be provided, and the variable symbol generator may control spacing of the clusters of constellation points in the signal plane based on the determined first and second desired power levels. According to other embodiments of the present invention, means for determining respective first and second desired power levels for respective first and second recipients are provided, along with means for assigning respective ones of the first and second bit positions to respective ones of the first and second recipients based on the determined first and second desired power levels.

In still other embodiments of the present invention, a communications system includes an error correction encoder that encodes a-bitstream according to an error correction code. A symbol generator generates respective symbols according to a signal constellation from respective groups of bits of the encoded bitstream such that a first bit position of the groups of bits correlates to clusters of signal plane constellation points of the signal constellation and a second bit position of the groups of bits correlates to relative positions within the clusters of constellation points. A spreader spreads the symbols produced by the symbol generator, and a transmitter transmits the spread symbols in a communications medium.

According to other embodiments of the present invention, a receiving station includes a receiver that receives a communications signal from a communications medium. A despreader despreads the received signal according to a spreading code. A symbol estimator generates a symbol estimate from the despread signal, and a variable decoder is operative to decode the symbol estimate according to a selected combination of an error correction code and a signal constellation of a plurality of selectable signal constellations. Preferably, the plurality of selectable signal constellations includes at least two signal constellations of different orders, the variable decoder decodes the symbol estimate according to a selected error correction code of a plurality of error correction codes including at least two error correction codes of different rates, and the despreader includes a variable despreader that despreads the received signal according to a selected spreading code of a plurality of selectable spreading codes including at least two spreading codes of different lengths.

According to method aspects of the present invention, respective ones of a plurality of bitstreams are error correction encoded according to respective error correction codes. Respective symbol streams are generated from respective ones of the respective encoded bitstreams according to respective signal constellations of a plurality of signal constellations, wherein the plurality of signal constellations includes at least two signal constellations of different order. Respective ones of the symbol streams are spread according to respective spreading codes. The spread symbol streams are transmitted in a communications medium. A signal constellation for application to a bitstream of the plurality of bitstreams may be selected to provide a desired information transmission rate for the bitstream, and may be selected based on signal transmission quality.

DETAILED DESCRIPTION

Figure 1:
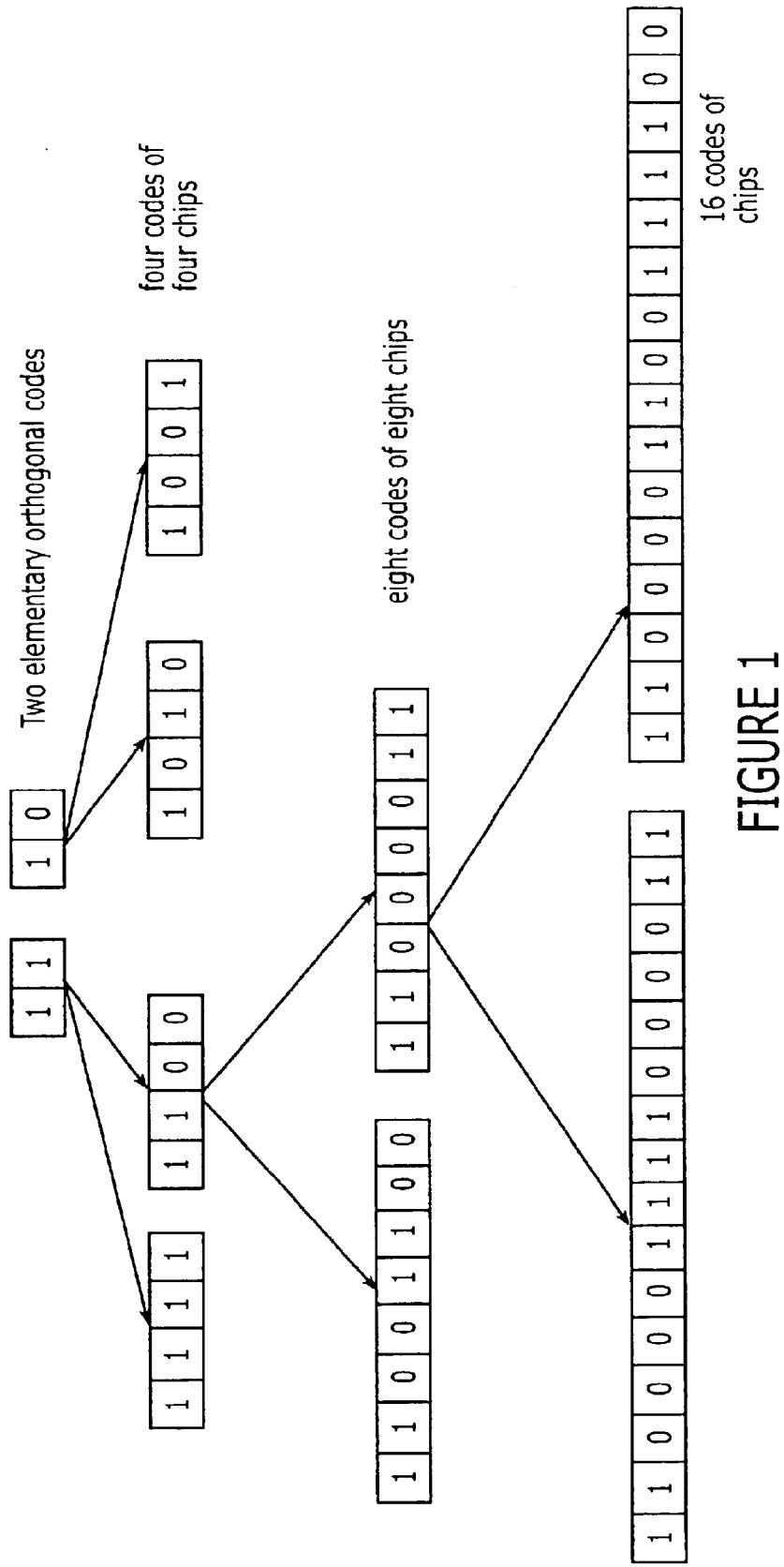
FIG. 1 is a chart graphically illustrating spreading codes according to the prior art.
Figure 2:
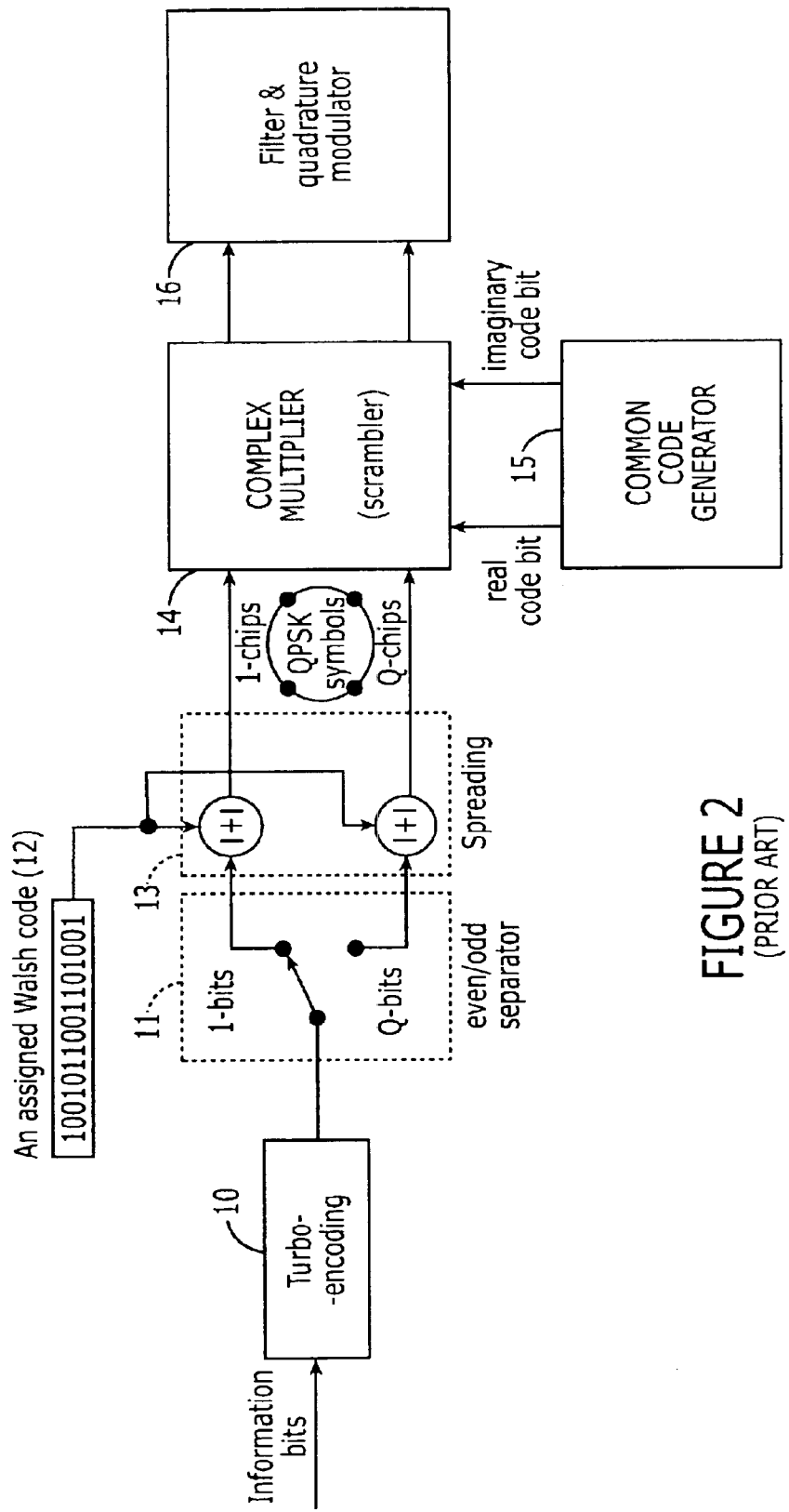
FIG. 2 is a block diagram illustrating CDMA signal transmission according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In the present application, block diagrams and flowcharts illustrate exemplary communications apparatus and operations according to embodiments of the present invention. It will be understood that blocks of the block diagrams and flowcharts, and combinations of blocks therein, may be implemented using one or more electronic circuits, such as circuits included in a cellular wireless communications system (e.g., in mobile switching centers (MSCs) and/or base stations (network stations) and/or other components), in wireless terminals configured to operate in such systems, as well in other types of wireless, wireline, optical and other communications systems. It will also be appreciated that, in general, blocks of the block diagrams and flowcharts, and combinations of blocks therein, may be implemented in one or more electronic circuits, such as in one or more discrete electronic components, one or more integrated circuits (ICs) and/or one or more application specific integrated circuits (ASICs), as well as by computer program instructions which may be executed by a computer or other data processing apparatus to produce a machine such that the instructions which execute on the computer or other programmable data processing apparatus create electronic circuits or other means that implement the functions specified in the block or blocks. The computer program instructions may also be executed on a computer or other data processing apparatus to cause a series of operations to be performed on the computer or other programmable apparatus to produce a computer implemented process such that the instructions which execute on the computer or other programmable apparatus provide operations for implementing the functions specified in the block or blocks. Accordingly, blocks of the block diagrams and flowcharts support electronic circuits and other means that perform the specified functions, as well as operations for performing the specified functions.

It will also be appreciated the apparatus and operations illustrated in the block diagrams and flowcharts may be implemented in a variety of communications environments, including wireless, wireline and optical communications environments. For example, the communications apparatus illustrated in the block diagrams and flowcharts may be incorporated in a wireless cellular base station transceiver, a wireline transceiver, optical transceiver, or other communications apparatus. It will be appreciated that the signal processing apparatus and operations illustrated in the block diagrams and flowcharts may be combined with other signal processing apparatus and operations (not shown), including additional coding, interleaving, filtering and/or amplifying apparatus (e.g., circuits that provide such functions) and operations.

Figure 3:
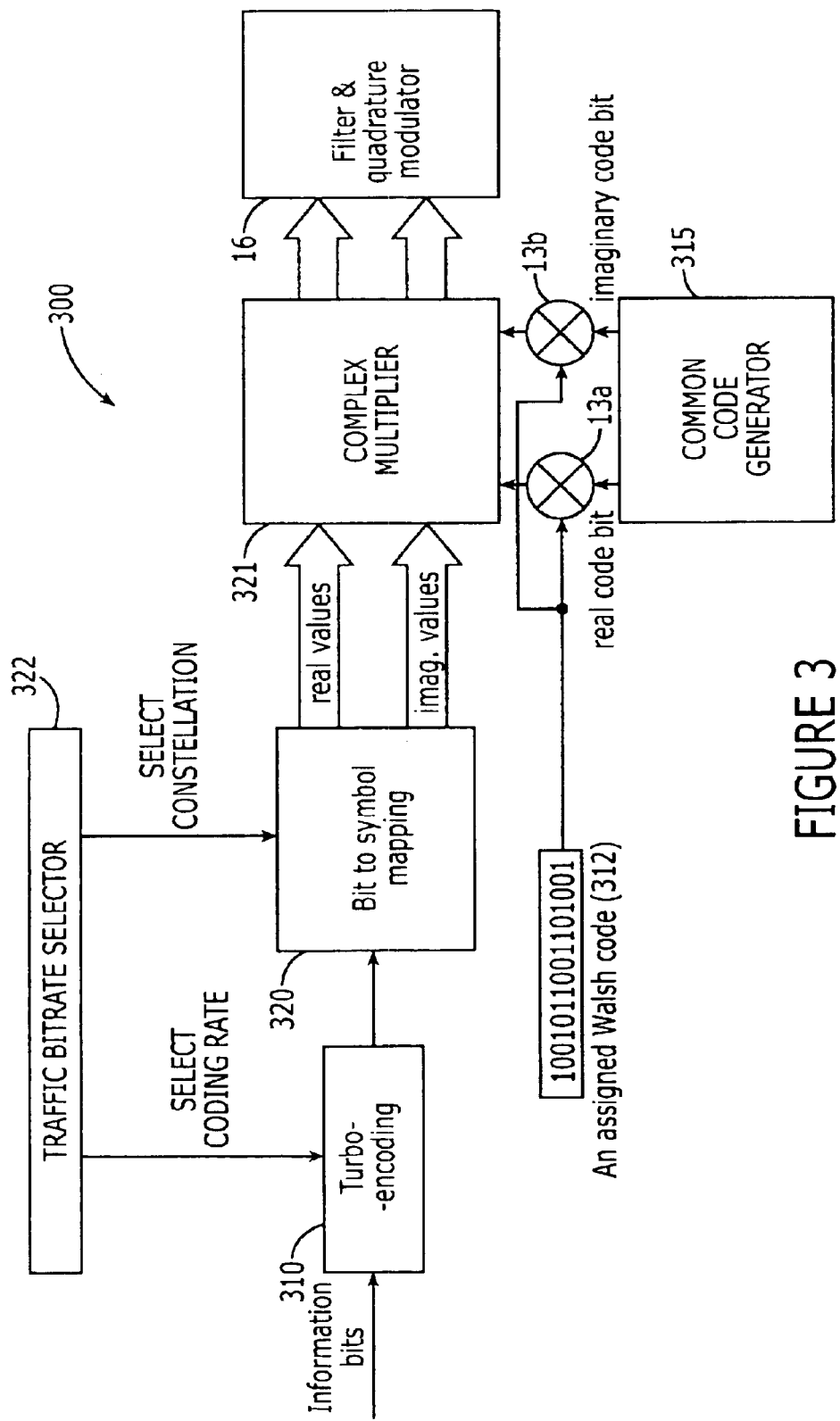
FIGS. 3, 7–14 are block diagrams illustrating communications systems according to various embodiments of the present invention.

FIG. 3 illustrates an apparatus 300 according to embodiments of the present invention. Information bits are turbo-encoded in a turbo encoder 310, with a coding rate selected by a traffic rate selector 322, which also selects a bit-to-symbol mapping function (signal constellation) applied by a variable symbol mapper 320. The bit-to-symbol mapping function applied by the variable symbol mapper 320 is selected from a plurality of selectable symbol mapping functions, including, for example, a bit-to-QPSK symbol mapping function and higher-order symbol mapping functions, such as function that map 3 bits at a time to an 8-psk constellation or 4 bits at a time to a 16-psk or 16-QAM constellation. It will be appreciated that the real and imaginary parts of symbols of higher order than QPSK are no longer just +1 or −1 according as an I-bit or Qbit is boolean 1 or zero, but take on values such as cos(nPi/8) and sin(nPi/8) for 16-psk. These irrational real and imaginary parts may be represented by multi-bit values to an acceptable accuracy, such as 8 bits. A complex scrambling multiplier 321 multiplies the values produced by the variable symbol mapper 320 by binary values produced by a common code generator 315.

As shown in FIG. 3, an assigned orthogonal code 312 is combined with the output of the common code generator 315 before application to the multiplier 321. It will be understood that this is a matter of convenience, and not required under the present invention. The output of the common code generator 315 and the assigned code 312 may alternatively be applied at the output of the turbo encoder 310 in separate multiplication operations. In other embodiments, the assigned code 312 could be combined with the real and imaginary parts of the output of the bit-to-symbol mapper 320.

The assigned code 312 could also be combined with the binary output of the turbo-encoder 310. However, under such a configuration, orthogonal transmissions would only occur if the variable symbol mapper 320 maps complementary bit patterns to diametrically opposite constellation points in the complex plane, a restriction that is usually met when using 16-psk or 16-QAM and, in general, a constellation of order two to an even power, but which is usually not met when using 8-psk or, in general, a constellation which is of order two to an odd power. Consequently, if the assigned code 312 is combined with each group of bits from turbo encoder 310, the constellation applied by the variable symbol mapper 320 preferably is such that diametrically opposite constellation points are associated with complementary bit patterns.

Accordingly, in some embodiments of the invention, the traffic selector 322 may select a symbol mapping function that maps more than two bits per symbol, and which assigns complementary bit patterns to be represented by diametrically opposite constellation points. The assigned code 312, e.g., an orthogonal CDMA spreading code, is then impressed by modulo-2 addition of an orthogonal code bit to all the bits of a repeated symbol, using successive bits of the orthogonal code for successive symbol repeats.

If such an assignment of bit patterns to constellation points is not that which it is desired to use to convey data bits, the data bit pattern it is desired to allocate to the constellation point can always be mapped using a 1:1 look-up table to a bit pattern that meets the above assignment criterion, in order then to apply the orthogonal code to it by modulo-2 addition. Likewise it is also possible to map the data pattern to a different data pattern in which approximately half of the bits alternate in sign between adjacent quadrants, thereby allowing rotations of 180 degrees to be applied by modulo-2 addition of one bit of a QPSK scrambling code to one half of the bits and rotations of 90 degrees to be applied by addition of the other bit of the QPSK scrambling ode to the other half of the bits.

It will be appreciated that performing this operation in the boolean logic domain may allow simpler logic realization than the complex multiplier approach. Other approaches are possible in special cases, such as when using a PSK constellation of the same order as the orthogonal code length, e.g. 16-PSK with a 16-value orthogonal Fourier code. The values of the orthogonal Fourier code are also 16-PSK symbols and after combination with the 16-PSK data symbols give 16-PSK chips. In this case, four-bit representations of the phase of a data symbol and an orthogonal code value can be combined using simple 4-bit arithmetic, thus avoiding full complex multiplication. This approach can also be used for longer orthogonal code lengths where the orthogonal code is structured as the product of a Fourier code of the right length with another Fourier or Walsh code set.

If it is desired to construct assigned orthogonal codes with lengths other than a power of 2, then Fourier sequences can be employed. Generally, all stations in the communications network should agree on the construction of these codes. Fourier sequences are sequences of complex values having a real and an imaginary part, and not just a sequence of binary bits having arithmetic values of +/−1. Full complex multiplication is therefore required to impress a Fourier spreading sequence on a set of repeated symbols, rather than the sign change which suffices for binary codes such as Walsh-Hadamard codes.

The common code generator 315 can generate a sequence of phase changes other than the multiples of 90 degrees obtained when its real and imaginary outputs are constrained to single binary bits. When the chosen symbol constellation is an M-PSK constellation and the code generator 315 generates scrambling phase sequences, the complex multiplier 321 can be simplified to a modulo-2π phase adder. Moreover, when the sequence of phases produced by the phase adder are caused to change smoothly between successive phase values while maintaining constant signal amplitude, a CDMA spreading technique known as Continuous Phase Modulation (CPM). All these variations may be employed with the present invention.

According to embodiments of the present invention, the invention can double the traffic bitrate if the traffic bitrate selector 322 selects a 16-psk mapping instead of a QPSK mapping, while leaving the assigned code (312) length unchanged. According to other embodiments of the present invention, the length of assigned code 312 may also be controlled. For example, the length of the assigned code 312 may be shortened to obtain a higher bitrate.

When a higher order constellation is selected, the power of the transmission may have to be increased to maintain the same error rate. However, as already mentioned in regard to the prior art of GSM/EDGE higher bitrate systems can use other means to control errors other than increasing the transmitter power. For example, it can be decided to allocate the higher constellations only for communicating to mobile stations that are not at the extreme edge of coverage of a network station or cell, consumption of power then typically being of lesser importance than the consumption of available orthogonal codes.

If a mobile station originally allocated a higher order constellation when in proximity to a network station moves to a more distant location, error-rate monitoring means may indicate the need to fall back to a lower-order constellation in order to reoptimize the trade-off between power and code space consumed in maintaining the link. However, it may be more effective to reduce the traffic bitrate by increasing the amount of error correction coding used while still using the higher order constellation.

FIG. 3 shows that the traffic rate selector 322 has the facility to vary either the order of bit-to-symbol mapping used, or the coding rate of turbo-coder 310, or both. In addition, the traffic rate selector 322 may also be operative to vary the length of the assigned orthogonal code 312. Therefore, embodiment of the present invention may include trellis-coding blocks of binary data bits to form corresponding blocks of coded M-ary symbols, the M-ary symbols each being repeated N times by multiplying N chips of a spreading code. The spreading code may furthermore be the product of an N-bit code, selected from a set of N mutually-orthogonal codes, with an N-chip common spreading code applied to all signals. When N is a power of two, the orthogonal code set can comprise binary codes of the Walsh-Hadamard variety. Alternatively, if N is not a power of two, the orthogonal code set can comprise N-value complex Fourier sequences. Hybrids of Walsh and Fourier sequences may also be used when N is a product of a power of two with a number which is not a power of two. The common spreading code produce by the common code generator 315 may be a binary spreading code such as a PRN sequence, or a complex code of QPSK symbols formed from two PRN sequences. In the latter case, the complex spreading code may be complex-multiplied with the complex trellis-coded symbols. The resulting trellis-coded, spread and scrambled CDMA chips may be interleaved such that consecutive ones of the N-value orthogonal code are not transmitted in consecutive chips, in order to obtain a signal that may be transmitted over a multipath channel without loss of orthogonality. Alternative forms of coding can include concatenated coding in which the information bits are expanded in number by a first error correction code, interleaved, and then trellis coded to M-ary symbols in a second error correction (trellis coding) operation.

Figure 4:
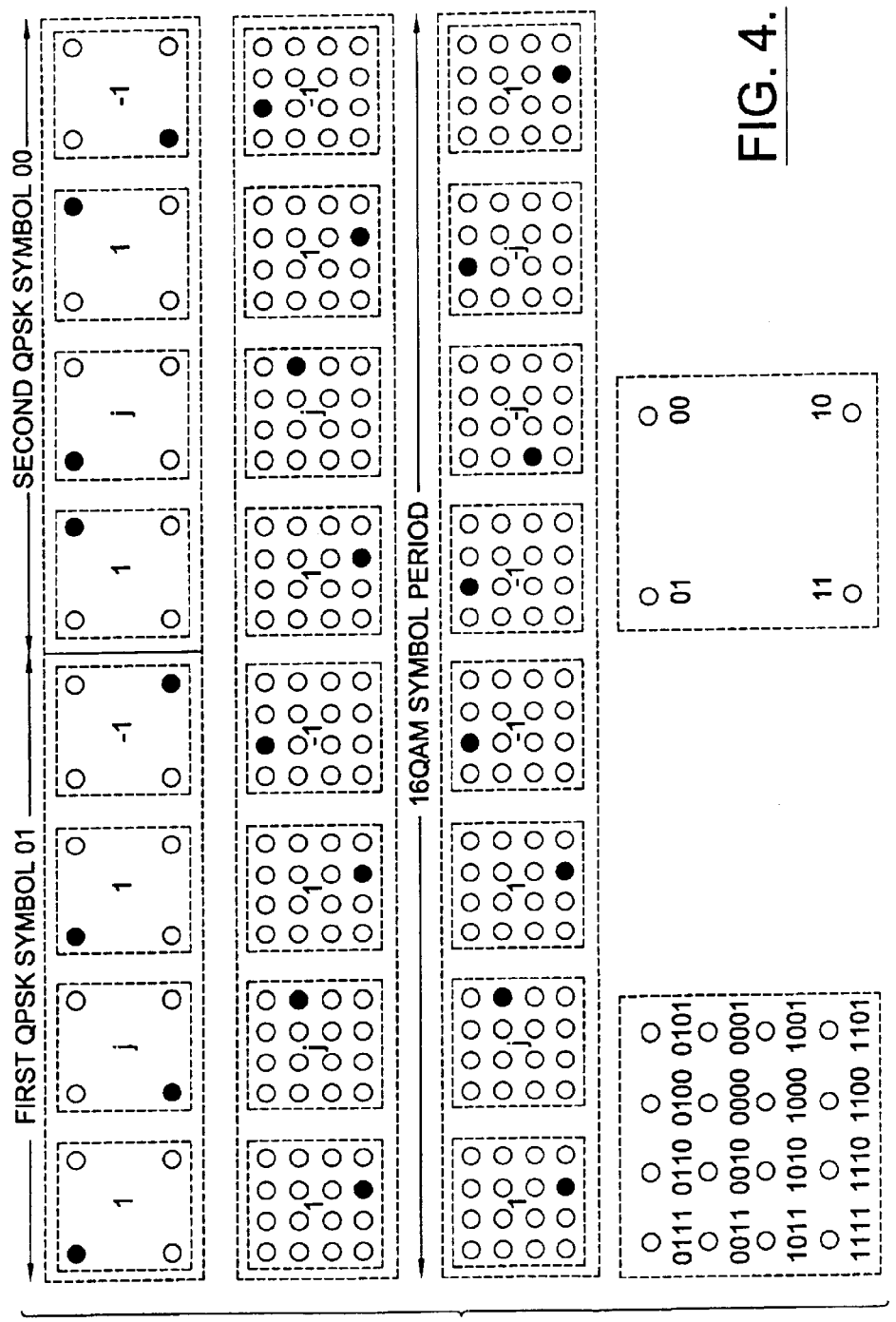
FIGS. 4–6 conceptually illustrate allocation of spreading codes according to embodiments of the present invention.

FIG. 4 shows an example of how switching to a higher-order constellation according to embodiments of the invention can double the number of orthogonal codes. In a first row of FIG. 4, QPSK symbols of two bits each are shown repeated four times with a phase rotation given by a complex spreading code 1 j 1–1. For simplicity, the same four values are used to spread the first QPSK symbol that represents the 2-bit pattern 01 and the second QPSK symbol that represents the two bit pattern 00. Thus, using a four-element spreading code, the four bits 0100 are transmitted in the period covered by FIG. 4. Since the QPSK constellation uses a four-element spreading code, it is possible to find four such codes that are mutually orthogonal when multiplying arbitrary QPSK data symbols, so that four simultaneous transmissions can overlap using QPSK modulation.

Figures 5, 6:
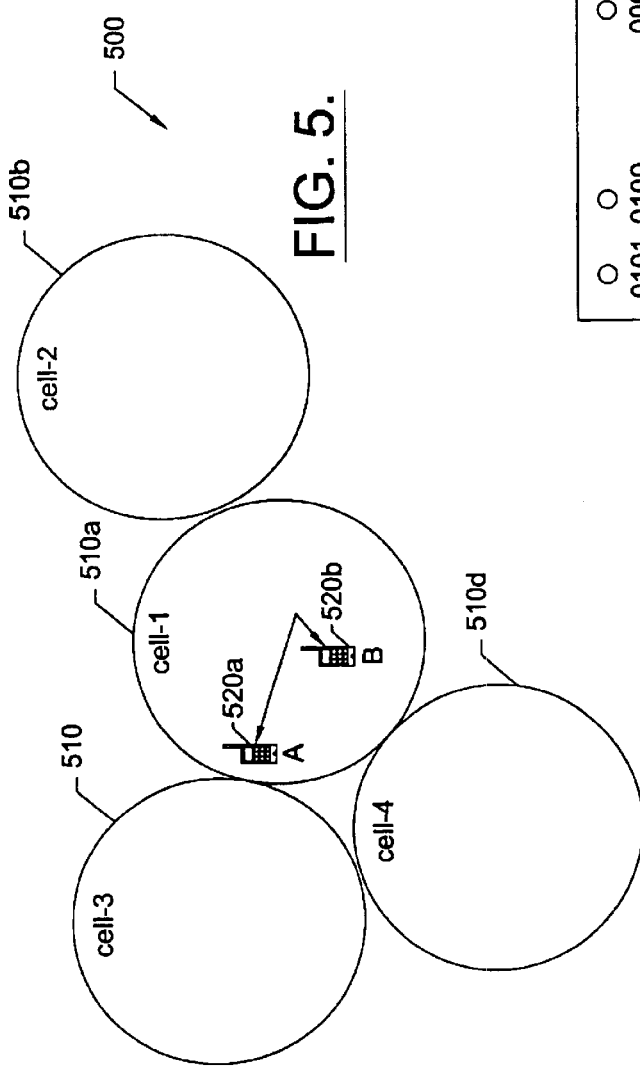

In a second row of FIG. 4, use of a higher order constellation, in this example a 16-QAM constellation, allows four bits to be transmitted per symbol. The assignment of 4-bit patterns to 16-QAM values and 2-bit patterns to QPSK values is shown at the bottom of FIG. 5. Using 16-QAM, the same amount of data (in the example the four bit data pattern 1100) is transmitted as in the QPSK case, but the symbol duration is twice as long, embracing eight spreading code values, which for simplicity are the shown to be the same values as in the QPSK case, namely 1 j 1–1 1 j 1–1. Since each 16-QAM symbol is now repeated eight times using an 8-element spreading code, it is possible to find eight mutually orthogonal spreading sequences instead of only four.

The source of the "extra" sequences is illustrated in a third row of FIG. 4, which shows a second signal transmitting, as it happens, the same four data bits 1100 but using the spreading code 1 j 1–1–1 j–1 1 which can be seen to be related to the spreading code used in the second row through inversion of the last four elements. The inverted last four elements, –1–j–1 1, typically would not be used as an orthogonal code in the QPSK case with 4-element spreading, as they generally could not be distinguished from the use of 1 j 1–1 multiplying a diametrically opposite QPSK symbol.

In the example of FIG. 4, adapting the constellation from QPSK to 16-QAM while doubling the orthogonal spreading code length and doubling the symbol duration can double the number of orthogonal codes and thereby accommodate more users of the system. In conventional FDMA systems, adapting from a QPSK constellation to a 16-QAM constellation in order to accommodate more users of the same traffic rate would typically require the radio receiver bandwidth to be halved, and for reasons of frequency accuracy, adjacent channel sensitivity, multipath propagation and Doppler fading rates, as well as the extra transmitter and receiver components required if both options are to be made available, such a change may involve other performance compromises. Consequently, such an approach is typically not practiced in GSM/EDGE systems; rather, a higher order constellation (i.e., 8-PSK as opposed to binary GMSK) is used in EDGE only to obtain higher data rate for the same (or even lower) number of users.

According to other embodiments of the present invention, a higher order constellation may be used to allow a greater number of users of the same traffic rate. Referring to FIG. 4, if the 16-QAM symbols were repeated the same number of times as the QPSK symbols using the same, 4-element orthogonal code (1 j 1–1), then the second row of FIG. 4 can be regarded as conveying the eight data bits 11001100, and the third row (which is now to be regarded as just another instance of the same signal as the second row, and not a second signal transmitted simultaneously) illustrates transmission of the eight data bits 11000110. Thus, eight data bits may be transmitted in the time span of FIG. 4, instead of four bits using QPSK, thus doubling the data rate. The eight bits may, however, be assigned two different users, giving them four each, thus accommodating twice the number of users at the same traffic rate.

According to still other embodiments of the present invention illustrated in FIG. 5, pairs of users may be assigned to same orthogonal spreading code with a higher order constellation. In particular, FIG. 5 illustrates four cells 510a, 510b, 510c, 510d of a cellular wireless network 500. Each cell is served by a different network station antenna (not shown) each of which is assumed to be located at the center of its respective cell. However, it will be understood that other configurations, e.g., those using cells served by sectorized antennas, may also be used.

Two terminals 520a, 520b are located within one cell 510a and wish to receive, for example, a voice service. Terminal 520a is close to the edge of the cell 510a, where it receives a weaker signal from the network station than does terminal 520b. Terminal 520a also receives stronger interference from neighboring cells 510c, 510d. Therefore, terminal 520a may require a stronger signal to decode than that needed by terminal 520b in order to combat noise and adjacent cell interference.

A 16-QAM constellation that may be used to transmit to terminals 520a, 520b is illustrated in FIG. 6. This constellation has unequal spacing and a specific allocation of the bit pairs so that the first two bits of each 4-bit pattern indicate a corner of the larger square and the second two bits of each four indicate the corner of the smaller square of constellation points. Since it generally is easier to distinguish in which corner of the larger square a signal sample lies, the first two bits may used to convey data to the more distant terminal 520a while the second two bits are used to convey data to the terminal 520b. The nearer terminal 520b receives a much stronger signal and much lower adjacent cell interference than terminal 520a and therefore may have little difficulty decoding data intended for terminal 520a error free, i.e., in determining in which of the corners of the large square each signal sample lies. Terminal 520b can then repenter the constellation from the determined corner to the center of the complex plane and then decode its own data as a QPSK constellation of four points. Thus, a criterion for terminal 520b to decode data successfully may be that it should be able to decode QPSK data represented by the smaller squares of constellation points. Terminal 520a may suffer a small degradation in the ability to decode data in the presence of data intended for terminal 520b, but if the signal for terminal 520b is, for example, 12 dB below the signal intended for terminal 520a, corresponding to less than a 2:1 range difference, this degradation may be less than 0.5 dB.

With independent feedback power control for each user, the transmitter could limit the proximity of the two power levels to that which reduced the constellation of FIG. 6 to a conventional equispaced 16 QAM constellation. On occasions that the latter occurs, it can be advantageous for each of the terminals 520a, 520b to decode their intended data signals simultaneously using a joint decoding algorithm, instead of sequentially, if maximum performance is desired. In such a case, both users may obtain the same performance and may require equal power transmissions from the network station. Such a method can be employed for a range of relative powers including equal and unequal powers. In the case that the power ratio of two users crosses through unity, it may be necessary for the network station to issue a reassignment command to change which bits of the multi-bit symbols are allocated to terminal 520a and which bits are allocated to terminal 520b. If discontinuous transmission (DTX) is used (whereby a transmission is silenced if there is temporarily no data to send), it may be advantageous for each receiver to detect the discontinuation of the other's data transmission and then to discontinue joint decoding (reverting then to QPSK decoding in this example).

A criterion for partitioning the bits of a multi-bit constellation between two users emerges from the above description. A first user (e.g., terminal 520a) would ideally be able to distinguish the bits intended for him without knowledge of the bits transmitted a second user (e.g., terminal 520b), while the second terminal 520b, on the other hand can have knowledge of the first user's bits when decoding his own. Expressing this criterion in more technical terms, the distance between any two constellation points representing different first bits (b1,b2) should be the greatest possible irrespective of the values of second bits (b3,b4), while, on the other hand, the distance between any two constellation points representing different second bits (b3,b4), given the first bits (b1,b2), should be a maximum. Reference may be made to the aforementioned application for methods to determine optimum bit assignments for other constellations, such as 32-PSK.

When two or more users are allocated to share the same orthogonal code in order to economize on the use of orthogonal codes as described above, it is not necessary for these users to be using spreading codes of the same length, providing the users having spreading codes of a longer length can decode the bits transmitted to users with a shorter spreading code. The decoding of the shorter spreading-code bits determines their effect on the symbol positions in the constellation, leaving the positions of bits using the longer spreading codes, and therefore repeated over a greater number of symbols, yet to be determined. By allowing for the effect of the already first-decoded bits, the symbols having different first decoded bits but the same undecoded bits can be combined to decode the as-yet undecoded bits using the longer orthogonal despreading code.

Figure 7:
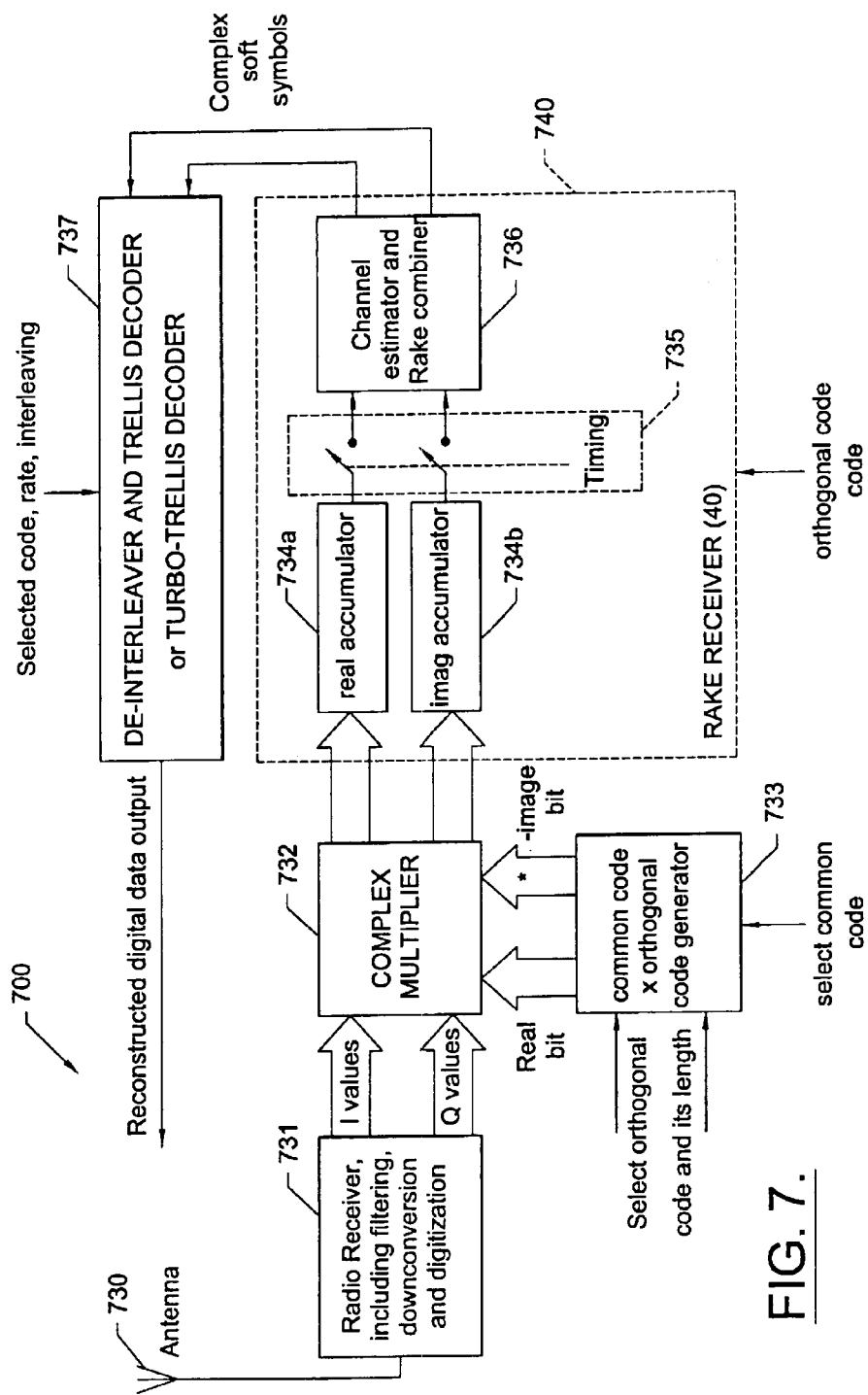

FIG. 7 illustrates a receiving apparatus 700 according to embodiments of the present invention. Signals received by an antenna 730 are amplified, filtered, downconverted, sampled and complex-digitized front-end circuitry 731 to obtain a suitable numerical form for processing. The sampling rate may be several samples per CDMA chip or alternatively one sample per chip. Suitable complex-digitizing methods include quadrature downconversion to In-phase (I) and Quadrature (Q) channels by mixing with local cosine and sine wave local oscillator signals, or quadrature sampling of an intermediate frequency signal using sample pairs spaced by an odd number of quarter cycles at the intermediate frequency. Alternatively, a logpolar method such as that described in U.S. Pat. No. 5,048,059 may be used, in which a first signal related to the logarithm of the instantaneous amplitude is digitized simultaneously with digitizing instantaneous phase-related values extracted from an amplitude-limited IF signal. The logpolar values may be converted to I,Q values by a logpolar-to-Cartesian conversion, i.e. by a complex exponentiation or "antilog" operation using look-up tables. In the case of logpolar digitization it is advantageous to locate the logpolar-to-Cartesian conversion after complex multiplier 732, as complex multiplier 732 then drastically simplifies to merely combining the real bit and the imaginary bit with the most significant two bits of the phase-related values.

The complex multiplier 732 derotates the phase angle by that multiple of 90 degrees indicated by the real and the imaginary bit from a code generator 733, or more generally, to derotate the received signal phase by the phase sequence (e.g., a CPM phase waveform) known a priori to have been imposed at the transmitter. Derotation may be accomplished, in general, using a full complex multiplier by emultiplying with the conjugate of the common code value used at the transmitter. Thus, in the illustrated case of a QPSK code, the imaginary bit is shown inverted or negated to "-imag", also indicated by the conjugation symbol "*" shown on the connection between the code generator 733 and the multiplier 732. Thus, the effect of both the orthogonal spreading code and the common scrambling code may be removed in the complex multiplier 732, and the remaining chips comprise N repeats of each coded information symbol all in the same phase relationship, where N is the spreading factor (i.e. the orthogonal code length in bits). The N in-phase symbol repeats produced are accumulated in a real accumulator 734a and an imaginary accumulator 734b to obtain complex, despread coded symbol values. These are dumped into a RAKE processor 736, e.g. a combination of a channel estimator and RAKE combiner, under the control of a timing unit 735, which simultaneously resets the accumulators 734a, 734b to make ready for the next accumulation.

The next accumulation may be an accumulation for the same coded information symbol but for a different time alignment between the received samples and the common code generator (i.e. a different RAKE tap), which time alignment may be changed in steps of fractions 1/L of a chip in the case receiver front end 731 digitizes received signals at L samples per chip. Alternatively the time alignment might only be changed in whole-chip steps in the case that received signals are digitized at one sample per chip, i.e. when RAKE taps are symbol-spaced. Different accumulators (734a, 734b) may be used for different RAKE taps (different time alignments) if speed demands. When all accumulations pertaining to the same symbol and different RAKE taps have been completed, the accumulator or accumulators then accumulate despread values over the next coded symbol period. All accumulations are fed to the RAKE processor.

The RAKE processor 736 may implement conventional RAKE processing techniques. The despread values corresponding to known symbols transmitted by the transmitter may be used to estimate the phase and amplitude of propagation paths of different delays to obtain "channel estimates" which are complex numbers. The conjugate of each channel estimate is used to multiply each unknown symbol accumulation value corresponding to the same multipath delay (same RAKE tap) in order to obtain complex-weighted values that have now been aligned in phase and weighted by owni amplitude so that weak multipath rays contribute less than strong ones. The weighted accumulations are then added to obtain RAKE-combined complex coded symbol values. The RAKE processor 736 may be varied according to conventional techniques, such as those described in U.S. Pat. No. 5,151,919 to Dent; U.S. Pat. No. 5,218,619 to Dent; U.S. Pat. No. 5,239,557 to Dent; U.S. Pat. No. 5,305,349 to Dent; U.S. Pat. No. 5,377,183 to Dent; U.S. Pat. No. 5,572,552 to Dent and Bottomley; U.S. Pat. No. 5,831,977 to Dent; U.S. Pat. No. 5,862,173 to Dent; U.S. Pat. No. 5,931,893 to Dent and Wang; and U.S. Pat. No. 5,944,774 to Dent, each of which is incorporated by reference herein in its entirety.

The output complex symbol values from RAKE processor 736 are known as soft symbol values, because they have not as yet been subject to a hard classification into one of the possible symbols of the chosen alphabet of M~2N symbols. Such a hard classification may never occur, as the purpose of an error-correction decoder 737 is to determine the most likely set of decoded information bits and not necessarily to determine the most likely quantization of the M-ary symbols, although the latter can be obtained by back-substituting the former if required.

When transmission-takes place using M-ary symbols each conveying a plurality of $N=\log_2(M)$ of binary information bits, there are ways to encode binary information and then to map the coded bits to Mary symbols, known in the art as Trellis Coding. Conventionally, Trellis coding typically comprises the limitation that successive coded bits to emerge from the error correction coder filled one multi-bit symbol before filling the next multibit symbol, ie., no bit-interleaving prior to bit-to-symbol mapping is used. In conventional Trellis coding, symbols could in principle be time-interleaved after bit-to-symbol mapping. One purpose of interleaving is to disperse the error correction coder output symbols or bits to segments of the transmission far apart in time, and therefore unlikely to be all corrupted at the same time by a signal fade. The use of such symbol interleaving, although theoretically permitted in conventional Trellis Coding, is generally more difficult to use when transmitting non-CDMA signals through a multipath channel liable to cause intersymbol interference (ISI). Generally, in such conventional Trellis Coding applications, it is more desirable that successive symbols out of the Trellis encoder be transmitted sequentially, so that ISI between adjacent symbols may be treated as part of the encoding process and compensated in a decoder of slightly more complexity.

In contrast, when using M-ary signaling in a spread-spectrum system according to embodiments of the present invention, the ISI occurs not between adjacent M-ary symbols, but between adjacent CDMA chips, and may be compensated by the use of a RAKE processor. Consequently, there may be no need to increase decoder complexity when Trellis-coded symbols are interleaved to non-adjacent segments of the transmitted signal.

It is also known that, in conventional CDMA, mutual orthogonality generally does not hold between different multipath rays of different transmissions. Therefore, when multipath propagation arises, the orthogonal coding typically serves only to prevent one multipath ray of each interferer from interfering with a given ray of a wanted signal, but rays of a different delay than the ray of the wanted signal may cause interference. Consequently, signals transmitted orthogonally from a fixed network station to different mobile subscriber terminals typically are no longer mutually orthogonal at the subscriber station when received through a multipath channel. This phenomena generally causes the dominant interference in CDMA cellular systems to be own-cell interference, and even at the edge of a cell ⅓rd of the interference or more can still be own-cell interference. U.S. patent application Ser. No. 08/989,392, entitled "ORTHOGONAL BLOCK SPREADING CODES FOR THE MULTIPATH ENVIRONMENT" filed Jul. 22, 1997, describes a technique by which orthogonality may be substantially preserved through a multipath channel by repeating N times, not the individual coded information symbols, but rather repeating blocks of K coded information symbols, where the duration of each block is greater than the maximum multipath delay. Each block, rather than each individual symbol, is subject to a sign change by successive bits of the assigned orthogonal code and to a scrambling phase change according to successive bit-pairs from a common code generator (such as the code generator 33 of FIG. 7). Such a signal is despread by removing the orthogonal code and the scrambling phase for all K symbols of the block such that the N repeated blocks are once more aligned in phase, and then combining corresponding symbols from each of the N block-repeats to obtain a single block of K despread symbols. When practicing such a technique, own-cell interference may be substantially eliminated, causing the dominant interference to be adjacent cell interference. For terminals not near the edge of a cell, the wanted signal to interference ratio of C/I can then be larger than necessary to support transmission of data using binary or QPSK symbols, particularly when high-performance turbo coding and decoding is used.

Accordingly, it may be advantageous to use higher-order symbol constellations to obtain higher datarate transmission to such users, rather than to use a shorter orthogonal code according to the prior art of variable-rate orthogonal coding, which has the disadvantage that the cell capacity could become limited by the number of available codes before it became limited by the C/I. This situation can also arise when orthogonality is not impacted so much by multipath propagation, as in satellite systems, or when own-cell interference is reduced by more advanced signal processing techniques such as interference subtraction, or multi-user demodulators.

In such circumstances, the ability of turbo codes to decode signals successfully almost down to 0 dB carrier to interference ratio (C/I) can remain unexploited due to the number of available orthogonal CDMA access codes, and therefore the number of simultaneously overlapping signals, being insufficient to reach the C/I limit. This may be exacerbated by the use of discontinuous transmission, in which transmitters temporarily having no data to send are turned off. This can result in less than half of the transmitters being instantaneously active, i.e., less than half of the available orthogonal codes may be instantaneously populated.

According to embodiments of the present invention, when the above circumstances are detected, certain users may be commanded to use longer orthogonal codes selected from a more numerous set of orthogonal codes, while coded data bits are mapped to higher order symbol constellations. The higher symbol constellations typically require a higher C/I to operate, but the use of longer orthogonal codes already provides a proportional increase in C/I. However, the number of users can now be increased to the C/I limit for the system due to the availability of more codes.

With continuing reference to FIG. 7, the error correction decoder 737 can be a convolutional decoder such as a Viterbi maximum likelihood sequence estimator or a Stack decoder, as described for decoding convolutionally coded data blocks or tailbiting convolutionally coded data in U.S. patent application Ser. No. 09/499,600, entitled "TAILBITING DECODER AND METHOD" filed Feb. 7, 2000, and incorporated by reference herein in its entirety. As embodiments of the present invention can provide techniques for avoiding capacity limitations due to orthogonal code availability, capacity may become C/I limited. It therefore may be advantageous to use the most advanced error correction coders and decoders that operate at the lowest energy-per-bit to noise density ratio (Eb/No), combined with choosing a multibit symbol constellation that will translate the Eb/No to the C/I of the fully-loaded system. The required C/I is related to the Eb/No by the formula $$C/I = (N/2) * Eb/No \quad (1)$$

where N is the number of bits per symbol for the chosen signal constellation.

In conventional CDMA systems such as those conforming to the IS-95 standard, if the actual C/I for any particular communications signal is greater than the C/I required to achieve an operable Eb/No, a feedback power control system is typically employed to reduce the signal power transmitted for that communications signal. This, in turn, reduces the interference to other signals, improving their C/I, allowing their power control systems to reduce the transmitted power for those signals as well until, ultimately, receiver thermal noise N becomes significant compared to the interference, reducing the combined C/(N+I) to the operable threshold. With the choice of BPSK or QPSK signaling only, and with modem high performance turbo codes that are operable around 1 dB Eb/No, and when non-orthogonal own-cell interference is not dominant or steps have been taken to reduce or eliminate it, it is likely that the required C/I will be exceeded even with all available orthogonal codes in use. Consequently, system capacity may be limited by the number of available orthogonal codes and not by C/I.

According to embodiments of the present invention, capacity may be increased by increasing the value of N in equation (1) to raise the required C/I to that achieved by the filly-loaded system, while increasing the number of orthogonal codes available. According to embodiments of the present invention, a network may determine quality of signals received at terminals, e.g., mobile subscriber terminals, and may detect when the quality at any particular terminal is above an adequate operational level. The network may then reduce the transmitted power to individual terminals using a power control system. A detector may detect when the power control system has reduced the total transmitted power significantly below a normally expected total transmitter power, and may indicate to a channel assignment system that at least -some terminals may be assigned a channel using higher order constellations to obtain higher user datarates or more orthogonal codes. Priority may be given to obtaining more orthogonal codes if a backlog in assigning channels to new subscribers existed. Alternatively, priority may be given to providing data as opposed to voice users higher user data rates. Voice users enjoying luxurious C/I values may be assigned higher order constellations and longer codes in order to release codes for new subscribers, when necessary. The objective of the channel assignment algorithm could be to accommodate the demanded number of voice and data calls as a first priority, and then to maximize the datarates of data users such as mobile web-browsers as a second priority.

In passing from QPSK to 16-PSK or 16-QAM, the number of bits per symbol doubles from two to four, allowing the same data rate to be transmitted with orthogonal codes of twice the duration and length in chips, thus doubling the number of codes available. Using an intermediate 8-PSK constellation however, the number of bits transmitted per symbol increases by a factor of 1.5 from two to three. Orthogonal codes based on the Walsh-Hadamard set can however only be constructed with lengths 2,4,8,16 etc, i.e., powers of two. In order to allow code lengths to remain power of two, the error-correction coding rate may be adapted for constellations such as 8-PSK, 32-PSK or 64-QAM, where the number of bits per symbol (3, 5 and 6 in these cases respectively) is not a power of two.

Suppose that in a typical conventional CDMA system, information is coded using a rate 1/3 code, thus tripling the number of bits to be transmitted, and that coded bits thus produce are mapped to QPSK symbols of two bits per symbol, giving a symbol rate of 3/2 times the information bit rate. According to embodiments of the present invention, if 8-PSK is used, it may be desired to halve the symbol rate to 3/4 times the information bitrate, thus doubling the number of codes. However, the number of bits per symbol is now three, giving a transmission bit rate of 9/4 times the information bitrate. The transmission rate may be matched to the information bitrate by adapting the error-correction code to be a rate 4/9 code. This can be achieved, for example, by using two concatenated rate 2/3 codes. Thus, information blocks may be coded using a first rate 2/3 code; the coded block, arranged as a rectangular block of bits may then be transposed, and then coded again (along the other dimension this time) using a second rate 2/3 code, which can be an Ungerboeck Trellis Code, thus completing the error-correction encoding. The encoded bits may be mapped to symbols using the chosen signal constellation and an optimum interleaving pattern. Alternatively, a parallel turbo-code can be used, as described further below, in which a first column-wise encoding produces two parity bits per four data bits and a second, row-wise encoding produces three parity bits per four data bits, thus producing in total, including the original data bits, nine coded bits per four data bits, i.e., a rate 4/9 code.

In general, if r1 is the coding rate used with the base constellation (QPSK) of two bits per symbol, then the coding rate r2 to use with a constellation of N bits per symbol is given by $$r2=2r1/N \text{ (for no increase in the number of orthogonal codes)}$$

$$\text{or } r2=4r1/N \text{ (to double the number of orthogonal codes)}$$

$$\text{or } r2=8r1/N \text{ (to increase the orthogonal code length by 4)}$$

and so forth, within the bounds that r2 should be less than 1 in order to retain some coding and preferably not greater than about 1/2 in order to retain 2:1 redundancy in the coding. Thus, with a base coding rate of 1/3 when QSPK is in use, the following options can be obtained:

$$r2=4r1/N \text{ for 8-PSK (N=3) giving } r2=4/9 \text{ and twice the number of orthogonal codes}$$

$$r2=4r1/5=4/15 \text{ for 32-psk, giving twice the number of codes,}$$

$$\text{or } r2=8r1/5=8/15 \text{ for 32-psk, giving four times the number of codes}$$

$$r2=8r1/6=4/9 \text{ for 64-QAM, giving four times the number of codes}$$

and so forth.

For the use of 16-QAM or 16-PSK with a power of two (4) bits per symbol, or 256-QAM or 256-PSK with 8 bits per symbol, the number of orthogonal codes may be simply be doubled or quadrupled compared to the base QPSK constellation without adapting the coding rate. As already mentioned above, instead of doubling the number of codes and therefore the capacity in terms of simultaneous users of the system, the same number of users may alternately communicate at twice the data rate.

When concatenated codes are used to improve performance over non-concatenated codes, the product of the code rates should equal r2. Turbo codes are, however, typically not serially concatenated codes, but parallel codes. Parallel (turbo) codes provide better performance at low Eb/No's when modest error rates such as $10^{-3}$ are desired, while serially concatenated codes provide better performance at the current state of the art when very low error probabilities are desired.

A parallel (turbo code) is constructed by arranging the M data bits in a rectangular matrix; running a first encoder along rows to generate M1 parity bits; running a second encoder along columns to generate M2 parity bits, then interleaving and transmitting the M data bits plus the M1+M2 parity bits, giving a rate r=M/(M+M1+M2) code. A code which transmits the M data bits unmodified as well as parity bits is called a "systematic code". This method may be used with multi-bit symbols by mapping the total number M+M1+M2 of bits to (M+M1+M2)/N symbols using any interleaver or grouping method, where N is the number of bits grouped to form each symbol.

If Trellis coding is desired to be employed as one of the above two turbo encoding steps, it may be implemented as follows. A first, systematic convolutional 30 coder runs along rows of the N data bit matrix and produces M1 parity bits. These M1 parity bits are then mapped to M1/N symbols using any interleaving or grouping method. A second, Trellis coder then runs down columns, generating M+M2 bits which are mapped to (M+M2)/N symbols by the Trellis code. The exact choice of coding and decoding methods described above are not material to this invention; however, higher performance coding techniques are generally more desirable. For more information on turbo codes and decoders, reference is made to IEEE Journal On Selected Areas In Communications, Volume 16 No. 2, 1998.

A turbo decoder usually receives soft bit information, e.g. from a RAKE combiner, and then interactively refines probability estimates for the bits to obtain a most likely set of information bits that would best explain the observed soft bit information. These probability estimates are referred to as Maximum A-posteriori Probabilities or MAP values. One approach to the decoding of multi-bit symbols is to convert the complex numbers output by the RAKE combiner to bitwise soft information for the coded bits, and then to perform turbo-processing of the coded bit soft information to produce the most likely decoding of the information bits.

An potential improvement to the above, however, comprises recomputing the transformation between complex number outputs of the RAKE combiner and soft coded bit likelihoods by feeding back partially decoded values of the other N-1 bits per symbol when refining the soft information for the Nth bit- Such an approach is described in U.S. Pat. No. 6,697,441, entitled "BASEBAND PROCESSORS AND METHODS AND SYSTEMS FOR DECODING A RECEIVED SIGNAL HAVING A TRANSMITTER OR CHANNEL INDUCED COUPLING BETWEEN BITS", filed Jun. 6, 2000 and incorporated herein by reference in its entirety.

Figure 8:
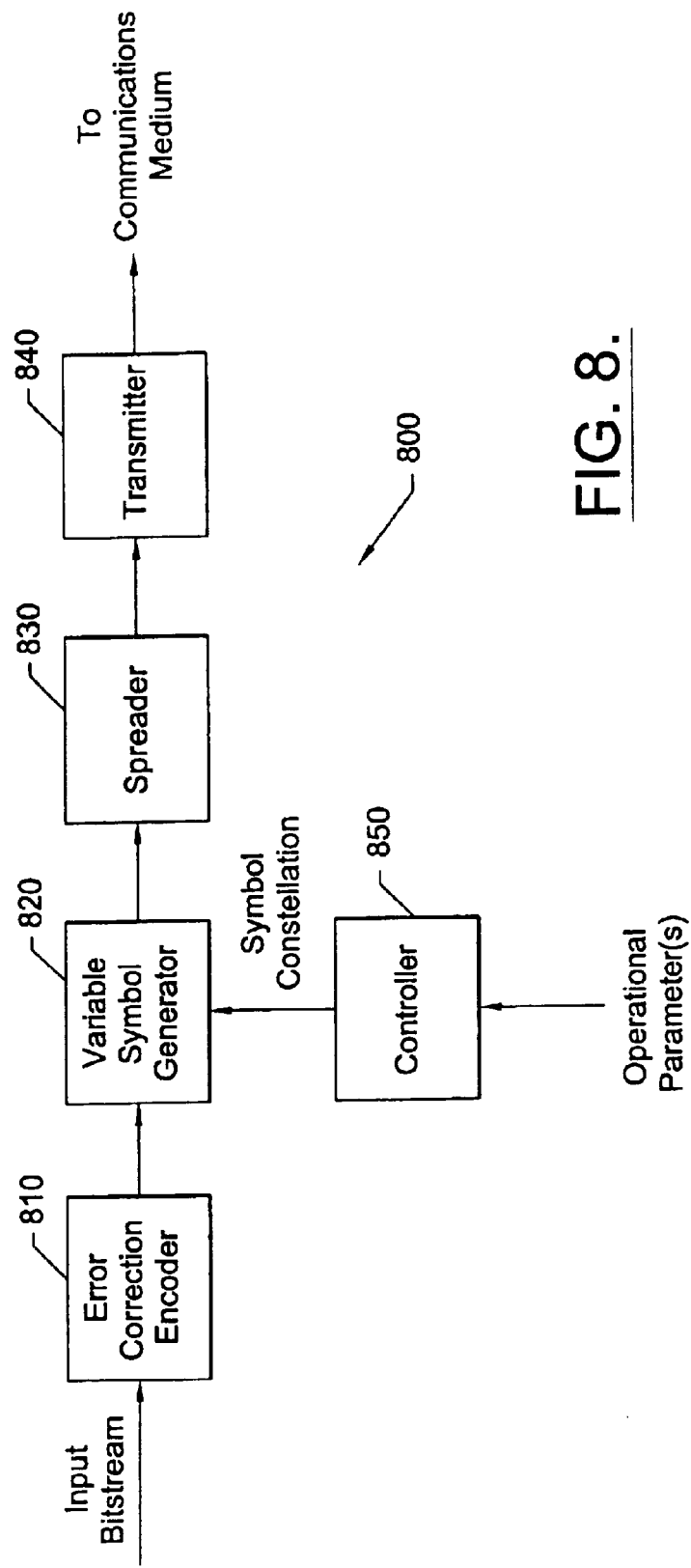

FIG. 8 illustrates a communications system 800 according to embodiments of the present invention, in particular, components as may be used to generate signals for transmission from a network station of a cellular wireless or other type of communications network. The communications system 800 includes an error correction encoder 810, a variable symbol generator 820, a spreader 830, a transmitter 840, and a controller 850. The error correction encoder 810 encodes an input bitstream according to an error correction code. The error correction encoder 810 may include a number of different encoding elements, including, but not limited to, convolutional encoders, block coders, interleavers, concatenated coders, Trellis coders, and "turbo" coders. The variable symbol generator 820 maps groups of bits of the encoded bitstream produced by the error correction encoder 810 to symbols of a selected signal constellation of a plurality of selectable signal constellations. The symbols thus produced are then spread according to a spreading code by the spreader 830. A transmitter 840 transmits the spread signals in a communications medium, e.g., by modulating I and Q components of the spread symbols by sine and cosine carriers, combining the carrier-modulated signals and transmitting them over a wireless, wireline or other communications medium. The transmitter 840 may perform any of a number of other operations, generally depending on the type of communications involved. Such operations are known to those skilled in the art and will not be discussed in detail herein.

According to embodiments of the present invention, the variable symbol generator 820 is operative to apply any of a variety of signal constellations of varying order to a given input bitstream, such as QPSK, 8-PSK, 16-QAM, and 64-QAM constellations. The particular signal constellation is selected by the controller 850 based on one or more operational parameters, such as the level of signal transmission quality desired for the bitstream, aggregate measures of signal transmission quality for a group of bitstreams transmitted by the communications systems, transmit power capability of the station, and the like. Several techniques for determining such operational parameters are known to those skilled in the art, may be used with the present invention, and will not be discussed in detail herein.

According to other embodiments of the present invention, the error correction codes and/or spreading codes applied in signal processing may also be varied, e.g., error correction codes of varying rates and spreading codes of varying lengths may be applied, in addition to the variation of signal constellations described above. In particular, a communications system 900 according to other embodiments of the present invention illustrated in FIG. 9 includes a variable error correction encoder 910, a variable symbol generator 920, a variable spreader 930, a transmitter 940 and a controller 950 that controls the variable error correction encoder 910, the variable symbol generator 920 and the variable spreader 930. The controller 950 selects the combination of error correction code, signal constellation and spreading code applied by the variable-error correction encoder 910, the variable symbol generator 920 and the variable spreader 930.

Responsive to one or more operational parameters, the controller 950 may cause the variable error correction encoder 910 to apply one of plurality of selectable error correction codes of varying rates. The controller 950 also may cause the variable symbol generator 920 to employ one of a plurality of selectable signal constellations of varying order, such as QPSK, 8-PSK (phase shift keying), 16-QAM (quadrature amplitude modulation), and 64-QAM constellations, and the variable spreader 930 to apply one of plurality of selectable spreading codes. In particular, the variable spreader 930 may apply a combination of an orthogonal spreading code, such as a Walsh-Hadamard code or a Fourier code (a complex spreading code derived from a Fourier sequence), and a "common" scrambling code, such as a pseudorandom (PRN) code, with the controller 950 controlling the length of the orthogonal code applied to control information transmission rate. By controlling the coding rate of the error correction encoder 910, the order of the signal constellation applied by the variable symbol generator 920 and the length of the orthogonal spreading code applied by the variable spreader 930, the controller 950 may provide a desired information transmission rate for the input bitstream.

Figure 9:
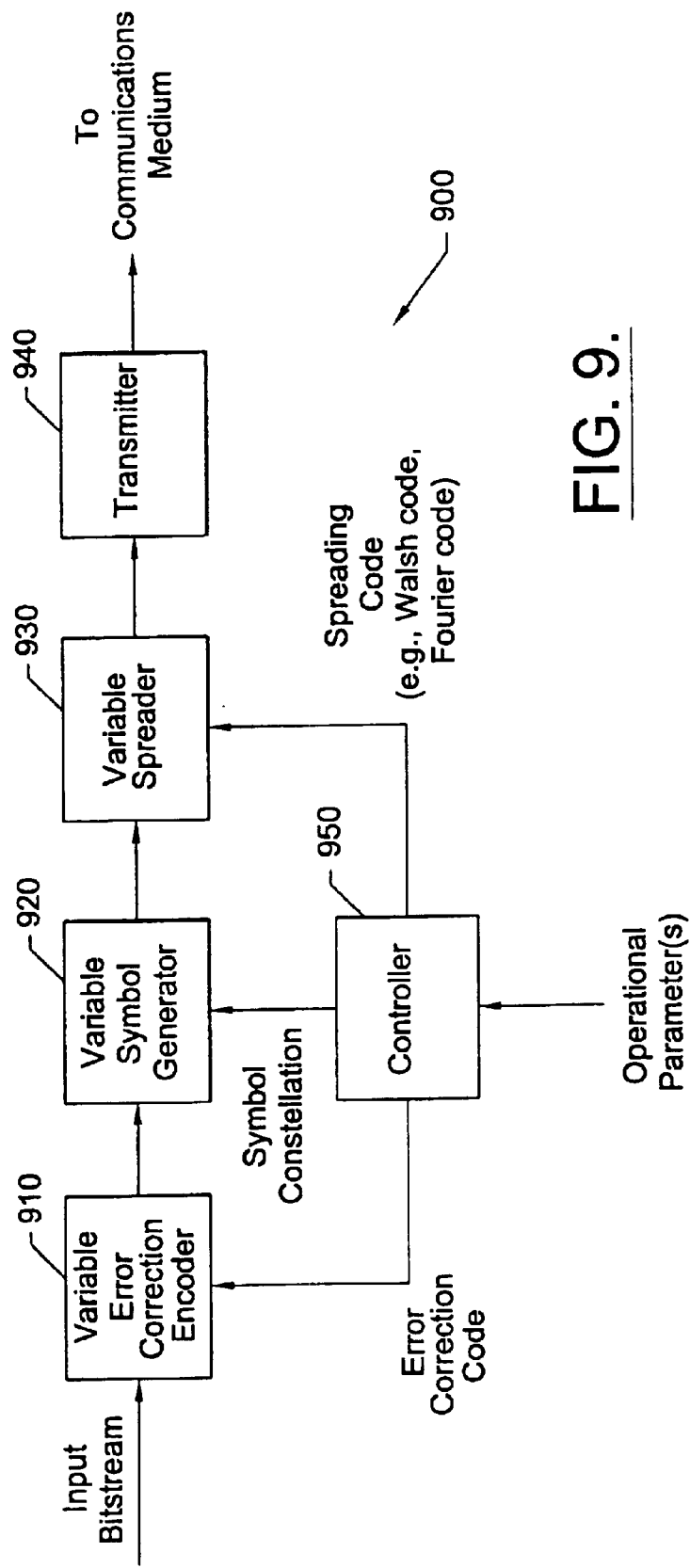

It will be appreciated that the error correction coding, bit-to-symbol mapping and spreading illustrated in FIGS. 8 and 9 may be implemented in a number of different processing configurations. Examples of implementations of these functions according to various embodiments of the present invention are illustrated in FIGS. 10–12.

Figure 10:
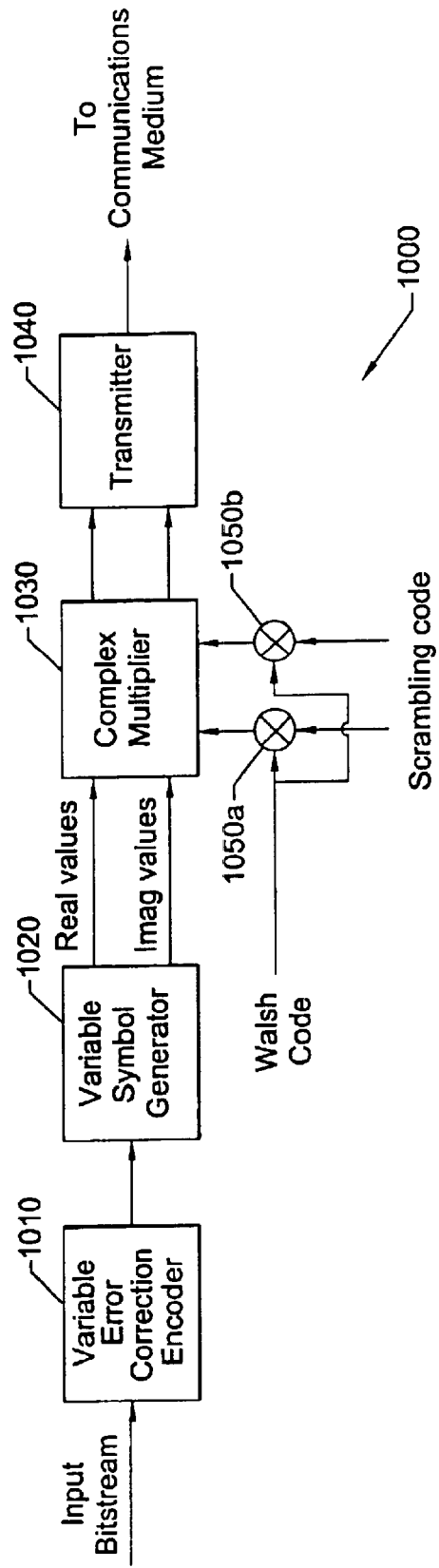

In embodiments of the present invention illustrated in FIG. 10, a communications system 1000 may include a variable error correction encoder 1010 that encodes an input bitstream according to a selected error correction code, and provides an error correction encoded bitstream to a variable symbol generator 1020. The variable symbol generator 1020 produces symbols from groups of bits of the error correction encoded bitstream according to a selected signal constellation, in a manner similar to that described above with reference to FIG. 9. In FIG. 10, the output symbols are shown in the form of pairs of real and imaginary values that represent signal constellation points in a signal plane. As will be appreciated by those skilled in the art, these real and imaginary symbol component values may be single bits (e.g., for QPSK mapping) or multi-bit values (e.g., for higher order constellations), with the number of bits being chosen to provide a desired degree of accuracy.

Spreading of these symbol components by a combination of an orthogonal spreading code, e.g., a Walsh-Hadamard code, and a complex scrambling code (the real and imaginary components of which may be binary values or, as in the case of continuous phase modulation (CPM) spreading, multi-bit values) is achieved by multiplying the real and imaginary components of the complex scrambling code by the orthogonal Walsh-Hadamard code in respective multipliers 1050a, 1050b. The resulting real and imaginary values are then used to multiply respective ones of the real and imaginary symbol component values produced by the variable symbol generator 1020 in a complex multiplier 1030. The resulting real and imaginary values produced by the complex multiplier 1030 are then passed on to a transmitter 1040 which may include, for example, a quadrature modulator that multiplies the spread symbol components by respective sine and cosine carrier signals to produce a carrier modulated communications signal that is amplified and then transmitted in a communications medium via an antenna. It will be appreciated that the combination of multipliers 1050a, 1050b and the complex multiplier 1030 may be used to variably spread the symbol components produced by the variable symbol generator in a manner similar to that described above with reference to FIG. 4 by varying the Walsh-Hadamard code applied to the multipliers 1060a, 1060b. More particularly, the length of the Walsh-Hadamard code applied may be varied to vary the transmission rate for the input bitstream.

Figure 11:
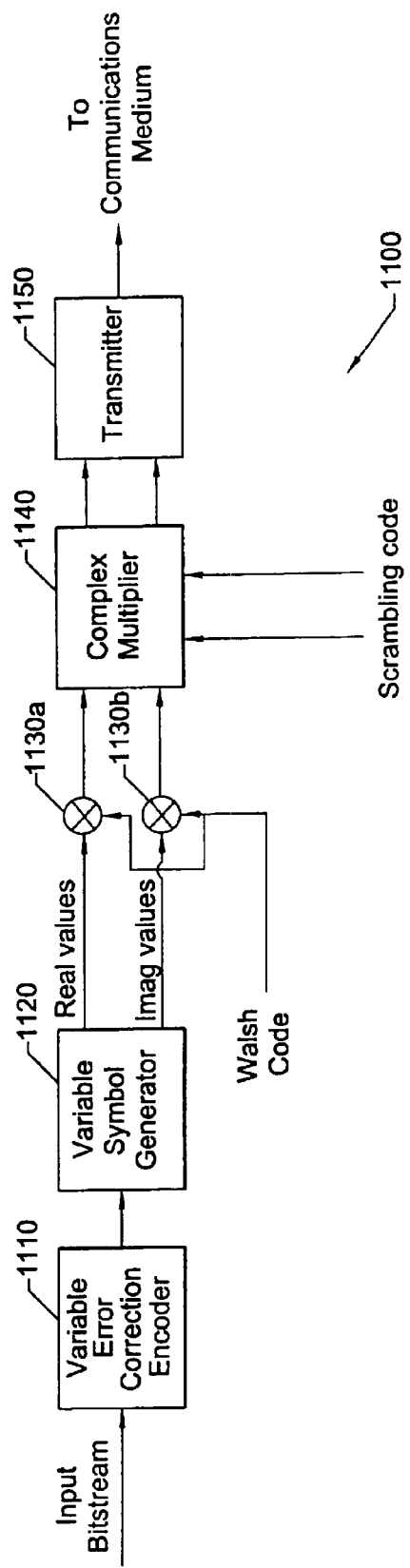
Figure 12:
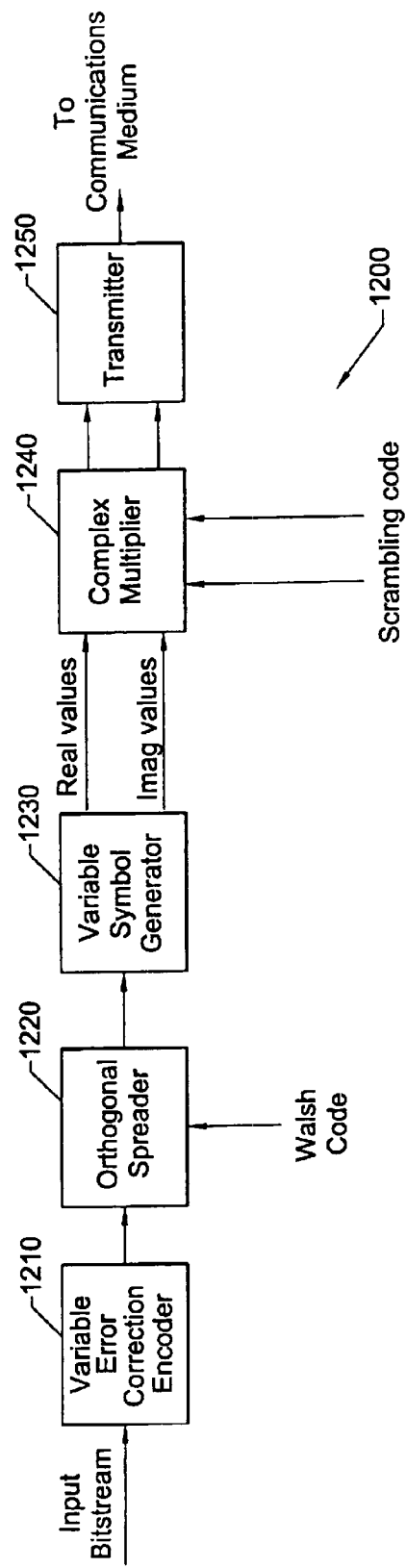

An alternative configuration is used in embodiments of the present invention illustrated in FIG. 11. Here, as in FIG. 10, a variable error correction encoder 1110 encodes an input bitstream to produce an error correction encoded bitstream that is mapped to symbols of a selected signal constellation by a variable symbol generator 1120, in a manner as described above with reference to FIG. 9. In FIG. 11, the real and imaginary symbol component values are each multiplied by an orthogonal Walsh-Hadamard code (which may be varied as described above) in multipliers 1130a, 1130b, to produce real and imaginary values that are complex multiplied by a scrambling code in a complex multiplier 1140. The resulting real and imaginary values are then transmitted in a communications medium by a transmitter 1150, for example, the real and imaginary values are carrier-modulated to produce a carrier-modulated communications signal that is ultimately transmitted in the communications medium, in a manner similar to that described above with reference to FIG. 5.

Yet another alternative processing configuration according to embodiments of the present invention is illustrated in FIG. 12. An input bitstream is error correction encoded according to a selected error correction code by a variable error correction encoder 1210. An orthogonal Walsh-Hadamard code is applied to the error corrected bitstream thus produced by multiplying the error correction encoded bitstream by the Walsh-Hadamard code in a multiplier 1220; as with the embodiments of FIGS. 10 and 11, the Walsh-Hadamard code applied may be varied to control transmission rate. Groups of bits of the spread bitstream thus produced are then mapped to symbol values by a variable symbol generator 1230, which produces real and imaginary symbol component values that are multiplied by a complex scrambling code in a complex multiplier 1240. The resulting scrambled symbols are then transmitted in a communications medium by a transmitter 1250, e.g., carrier modulated, amplified and transmitted as described above with reference to FIG. 10.

For the embodiments of FIG. 12, in order to maintain orthogonality between transmissions of different users, it may be desirable to constrain the possible signal constellations that may be applied by the variable symbol generator 1230 to mappings that map complementary bit patterns to diametrically opposite constellation points in the signal plane (i.e., points that represent 180 degree rotations of one another). Such a restriction may typically be met by 16-PSK, 16-QAM, and other constellations having an order of two to an even power (i.e., constellations that map an even number of bits to a constellation point), but not by 8-PSK or other constellations having an order of two to an odd power (ie., constellations that map an odd number of bits to a constellation point). Thus, according to embodiments of the invention, a signal constellation may be chosen that maps complementary bit patterns to diametrically opposite constellation points, and an orthogonal spreading code may be applied to the error correction encoded output of the variable error correction encoder 1210 by modulo-2 addition of the bits of the orthogonal code to all of the bits of a repeated symbol, using successive bits of the orthogonal code for successive symbol repeats.

If a particular bit pattern for transmission does not meet this assignment criterion (i.e., that its complement maps to a diametrically opposite constellation point), it may be mapped to a bit pattern that does using a 1:1 lookup table, and the orthogonal code applied to this cross-referenced pattern using the modulo-2 addition procedure described above. Likewise, the desired bit pattern may be mapped to a different bit pattern in which approximately half the bits alternate in sign between adjacent quadrants, thereby allowing rotations of 180 degrees to be applied by modulo-2 addition of one bit of a QPSK scrambling code to one-half of the bits and rotations of 90 degrees to be applied by addition of the other bit of the QPSK scrambling code to the other half of the bits. It will be appreciated that performing such operations in a Boolean (logic) domain may allow simpler implementation than an approaches employing complex multipliers. Other approaches are also possible in special cases, such as when using a PSK constellation of the same order as the orthogonal code length, e.g., 16-PSK with a 16-value Fourier code. In such cases, the values of the orthogonal Fourier code are also 16-PSK symbols and, after combination with the 16-PSK data symbols, yield 16-PSK chips. In such a case, four-bit representations of the phase of a data symbol and an orthogonal code value may be combined using 4-bit arithmetic, which can also avoid complex multiplication. This approach can also be used for longer orthogonal code lengths where the orthogonal code is structured as the product of a Fourier code of the right length with another Fourier or Walsh-Hadamard code set.

It will be also be appreciated that the present invention is not limited to the processing configurations illustrated in FIGS. 10–12. For example, as alluded to above, Fourier codes may be used instead of Walsh-Hadamard codes. Such codes are described in a U.S. patent application Ser. No. 09/340,907 to Dent, entitled "MULTICARRIER ORTHOGONAL CODING" filed Jun. 28, 1999 and incorporated herein by reference in its entirety. Such codes are typically sequences of complex values having real and imaginary parts; accordingly, if such codes are used in place of the Walsh-Hadamard codes illustrated in FIGS. 10–12, the multiplication operations illustrated therein may involve complex multiplication operations or, in special cases, reduced complexity computations that may replace such complex multiplication.

Figure 13:
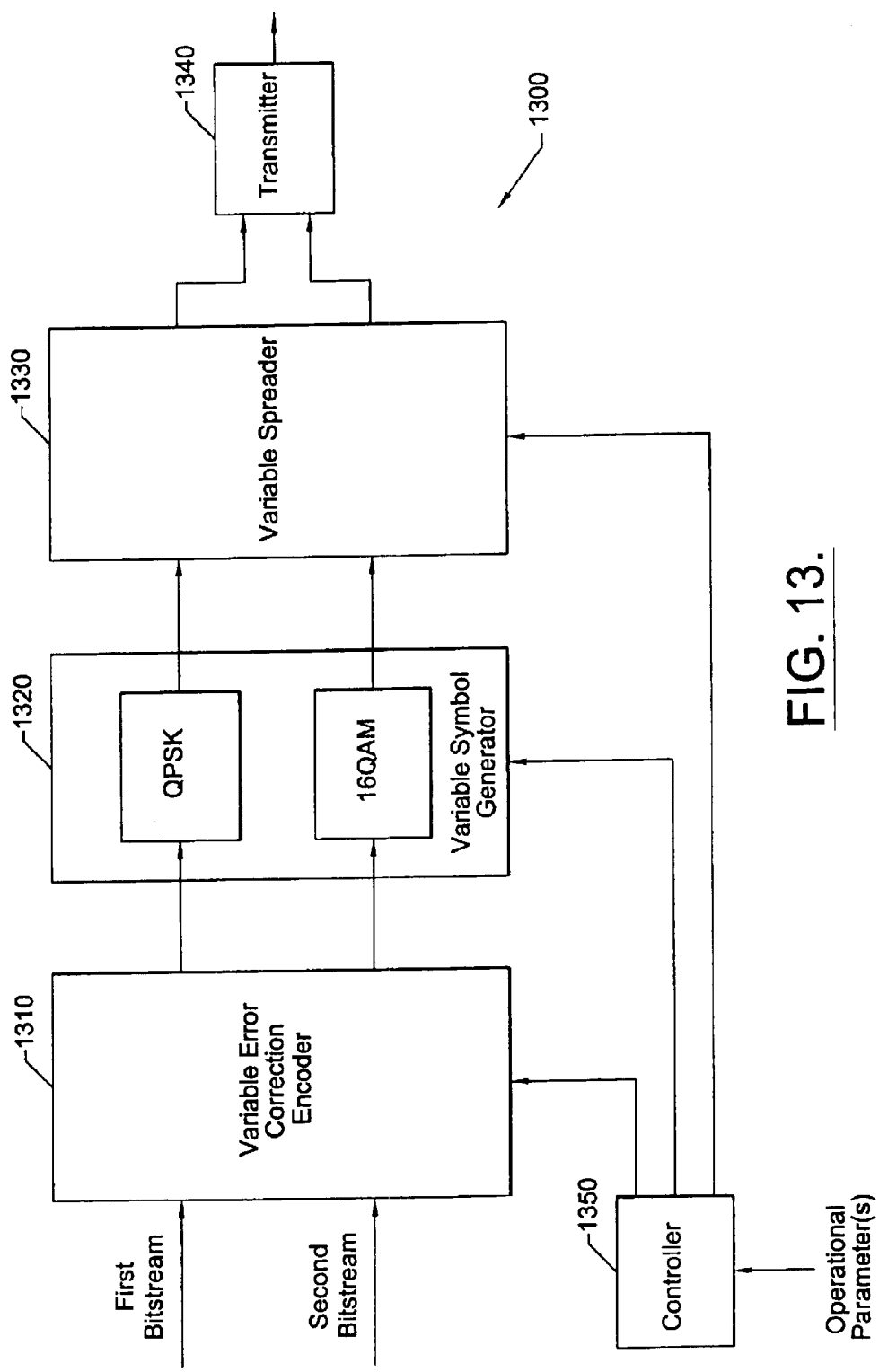

FIG. 13 illustrates embodiments of the present invention in which a communications system 1300 may support multiple information rates by varying the signal constellations applied to different bitstreams. First and second bitstreams, e.g., bitstreams intended for different wireless terminals, are error correction encoded according to the same error correction code in error correction encoder 1310. If operational parameters indicate that it is desired to provide a higher information transmission rate for the first bitstream, a controller 1350 causes a variable symbol generator 1320 to apply a higher order signal constellation (e.g., 16-QAM) to the error correction encoded bitstream produced from the first input bitstream, and a lower order signal constellation (e.g., QPSK) to the error correction encoded bitstream produced from the second input bitstream. The symbol streams thus produced may then be spread according to orthogonal spreading codes of the same length in a variable spreader 1330, and the resulting spread symbols transmitted in a communications medium by a transmitter 1340. By using the higher-order constellation for the first input bitstream, its information transmission rate may be increased over that of the second input bitstream, without requiring use of a shorter spreading code for the first bitstream.

It will be appreciated that when such a higher order constellation is used, however, it may be desirable to increase transmission power for the signal thus produced to maintain a desired signal transmission quality (e.g., bit or frame error rate). However, it will be appreciated that additional techniques may be used to improve signal transmission quality, such as retransmission techniques, smart acknowledgment techniques, or selective allocations of constellations. For example, in a wireless communications system, allocation of higher-order constellations may be limited to use with recipient terminals that are not at the extreme edge of the range of the communications system, for which consumption of power may be a lesser consideration. If such a terminal, that is, a terminal allocated a higher order constellation while at a relatively nearby location, then moves to a more distant location, it may be desirable to change the signal constellation applied to this bitstream to a lower order constellation. In such event, the controller 1350 may cause the spreader 1330 to apply a correspondingly shortened spreading code and/or the error correction encoder 1310 to apply a lower redundancy error correction code to maintain a desired information transmission rate. In this manner, tradeoffs between transmit power, signal transmission quality, use of available spreading codes and other performance parameters may be effected.

Figure 14:
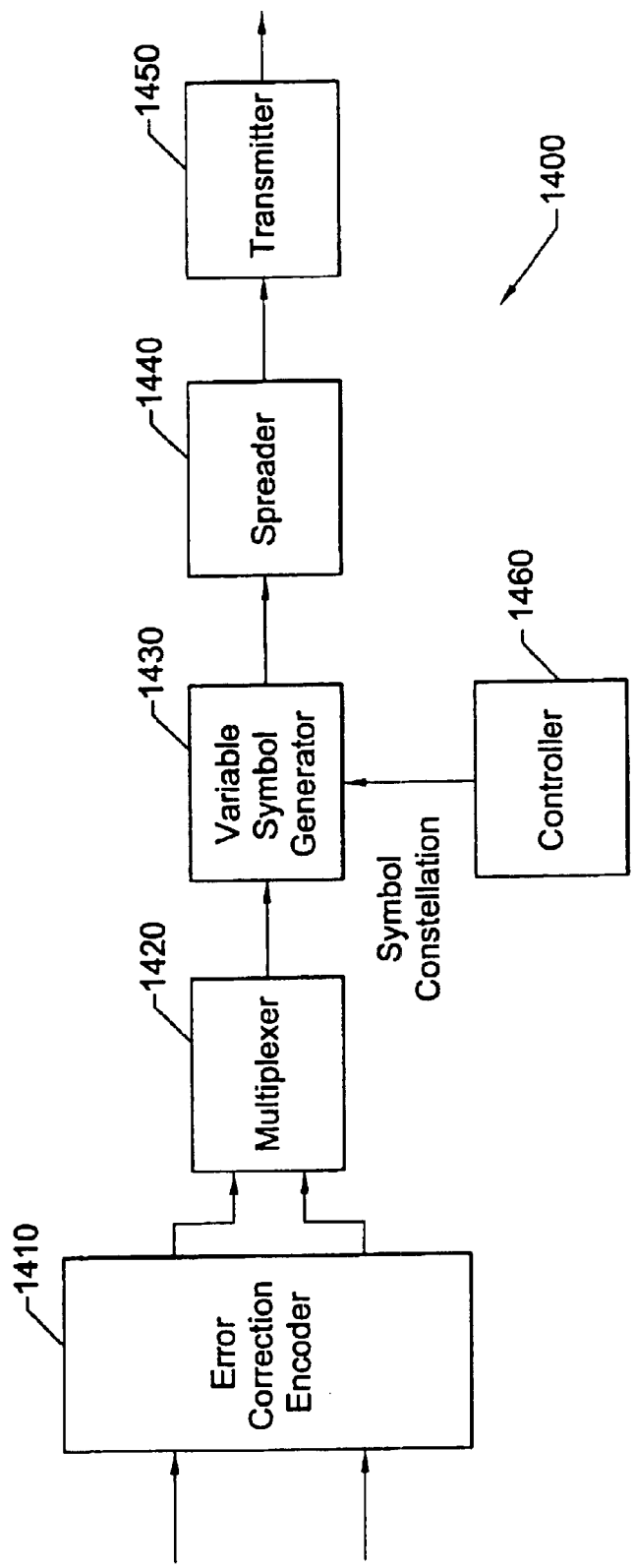

The ability to use and reconfigure higher-order signal constellations (e.g., signal constellations of higher order than QPSK) according to other embodiments of the present invention also can provide a communications systems with the capability to allocate a single spreading code to multiple recipients. As illustrated in FIG. 14, a communications system 1400 according to embodiments of the present invention includes an error correction encoder 1410 that encodes first and second bitstreams, e.g., bitstreams intended for different recipients, according to respective error correction codes, which may be the same or different. The error correction encoded bitstreams are then combined in a multiplexer 1420 to produce a single bitstream that is fed to a variable symbol generator 1430 that applies a selected signal constellation under control of a controller 1460, producing symbols that are spread by a spreader 1440 and transmitted by a transmitter 1450.

Figure 15:
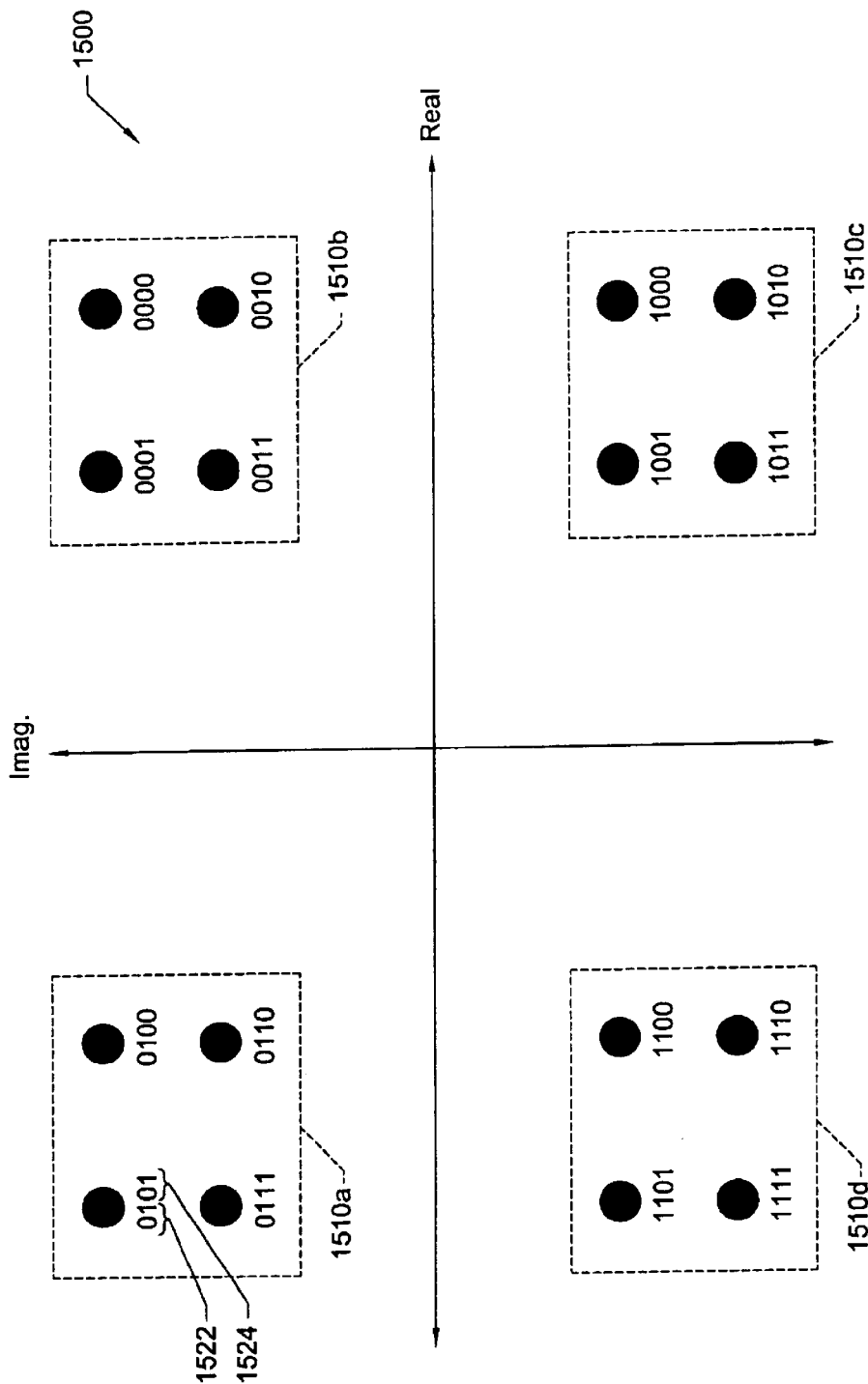
FIG. 15 is a signal plane diagram illustrating a signal constellation according to embodiments of the present invention.

In particular, the variable symbol generator 1430 applies a signal constellation that is specially configured to map bits of the combined bitstreams that are associated with a the first bitstream to "clusters" of constellation points, and bits associated with the second bitstream to relative positions within each of these clusters. This may be more readily understood by reference to FIG. 15, which illustrates a clustered 16-QAM constellation 1500 in the signal plane. The constellation 1500 correlates values of a first selected bit position 1522 to clusters 1510*a*, 1510*b*, 1510*c*, 1510*d* of constellation points positioned in respective quadrants of the signal plane. Values of a second bit position 1524 correlate to relative positions within each of the clusters 1510*a*,1510*b*, 1510*c*, 1510*d*.

Figure 16:
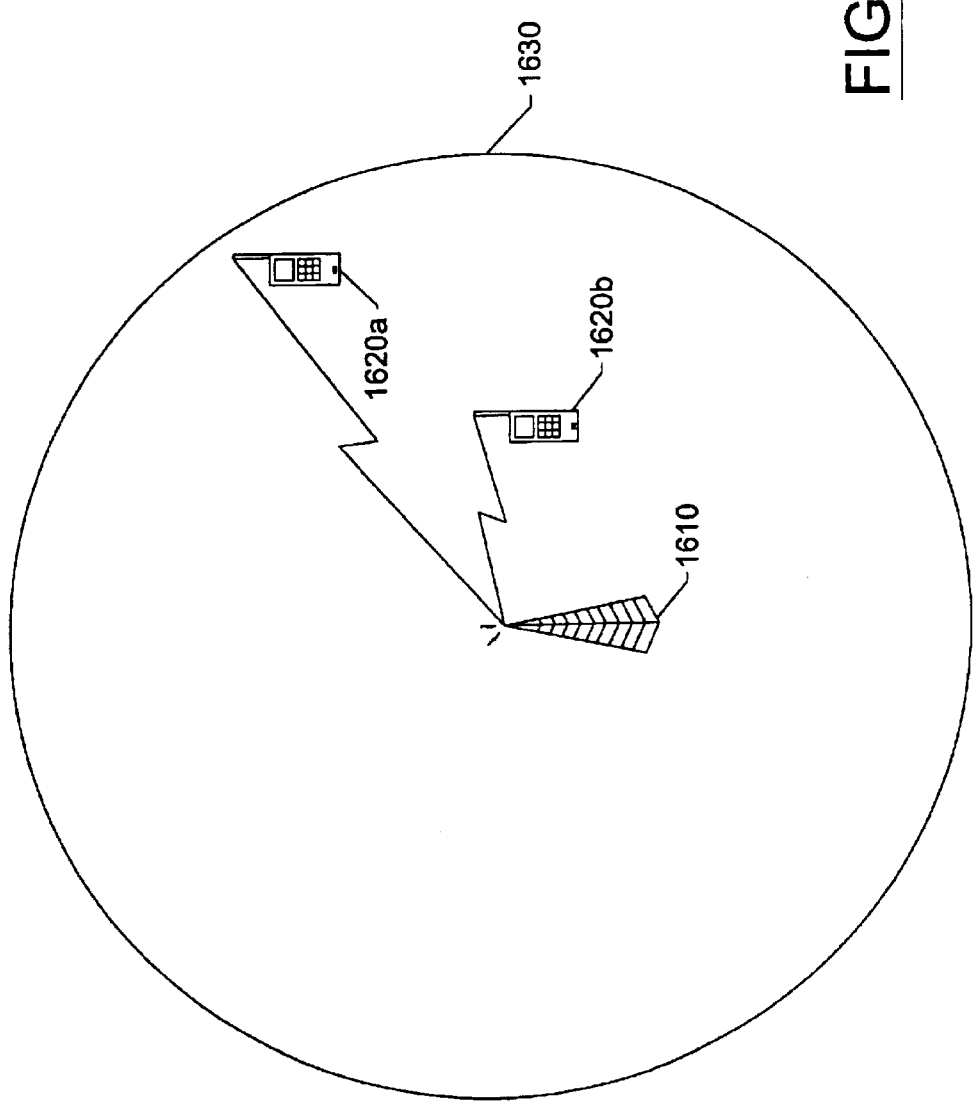
FIG. 16 is a schematic diagram illustrating a wireless communications cell according to embodiments of the present invention.

This clustering of constellation points allows respective first and second recipients of the first and second bitstreams to recover that information intended for each, even though a common spreading code is applied to each bitstream. Referring now to FIG. 16, first and second recipient terminals 1620*a*, 1620*b* are located in a cell 1630 served by a base station 1610. As shown, the first terminal 1620*a* is more distant from the base station 1610 than the second terminal 1620*b*, and thus, presumably, more subject to noise and adjacent cell interference. Referring again to FIG. 15, because it is generally easier for a receiver to distinguish in which of the clusters 1510*a*, 1510*b*, 1510*c*, 1510*d* a signal sample lies, the first recipient terminal 1620*a*, which generally experiences a lower signal level, may be assigned the bit position 1522 correlated with cluster location. The nearer second terminal 1620*b* may be assigned the other bit position 1524, as it should generally receive a signal strong enough for it to determine relative position of a signal sample within a given cluster. For example, for the 16-QAM constellation 1500 illustrated in FIG. 15, the second terminal 1620*b* can extract its information by first determining which of the clusters 1510*a*, 1510*b*, 1510*c*, 1510*d* a signal sample it receives lies. Using this information, the second terminal 1620*b* can then translate the identified cluster to the center of the complex plane, and decode information intended for it using a QPSK decoding technique.

It will be appreciated that the first terminal 1620*a* may suffer a degradation of its ability to decode information intended for it due to the presence of data intended for the second terminal 1620*b*, but this degradation may be acceptably small. For example, if the signal for the second terminal 1620*b* is 12 dB below the signal for the first terminal 1620*a*, corresponding to less than a 2:1 range difference, the first terminal 1620*a* would suffer only approximately a 0.5 dB degradation. The base station 1610 may exercise independent power control for each recipient terminal 1620*a*, 1620*b*, i.e., changing the spacing of the clusters 1510*a*, 1510*b*, 1510*c*, 1510*d* with respect to one another, as well as the spacing of the constellation points therein. The base station 1610 may limit the proximity of the power levels to that which effectively reduces the constellation 1500 of FIG. 15 to an equispaced 16-QAM constellation. When such effective equispacing occurs, it may be advantageous for each of the recipient terminals 1620*a*, 1620*b* to decode data for both of the terminals simultaneously using a joint decoding algorithm. In the case that the power levels for the terminals 1620*a*, 1620*b* cross over, for example, when the formerly distant first terminal 1620*a* moves closer to the base station 1610 than the second terminal 1620*b*, the base station 1610 may reverse the reassignments of the bit positions 1522, 1524 to the terminals 1620*a*, 1620*b*. If discontinuous transmission (DTX) is used, it may be advantageous for each terminal 1620*a*, 1620*b* to detect the discontinuation of the other's transmission, and discontinue joint decoding (in the example given, this could mean reverting to QPSK decoding).

The clustering described above may be viewed as follows. A signal constellation is selected such that a first user (one that requires greater signal power) may detect information (bits) intended for it without knowledge of information transmitted to a second user (one requiring a weaker signal), and the second user may decode information intended for it using knowledge of the information transmitted to the first user. In other words, the distance between respective constellation points representing respective values of first bit position 1622 preferably is the greatest possible distance irrespective of the values of the second bit position 1624, while the distance between respective constellation points representing different second bit position 1624 values given the values of the first bit position 1622 is preferably a maximum. When two or more users are allocated to share a common orthogonal spreading code, it may be unnecessary for these users to use spreading codes of the same length, provided that the users using longer spreading codes can the decode the bits transmitted to users with shorter spreading codes. The decoding of the bits spread according to the shorter spreading code determines their effect on the symbol positions in the constellation, leaving the positions of bits using the longer spreading codes, and therefore repeated over a greater number of symbols, yet to be determined. By allowing for the effect of the already first-decoded bits, the symbols having different first decoded bits, but the same undecoded bits, can be combined to decode the as-yet-undecoded bits using the longer orthogonal despreading code.

Figure 17:
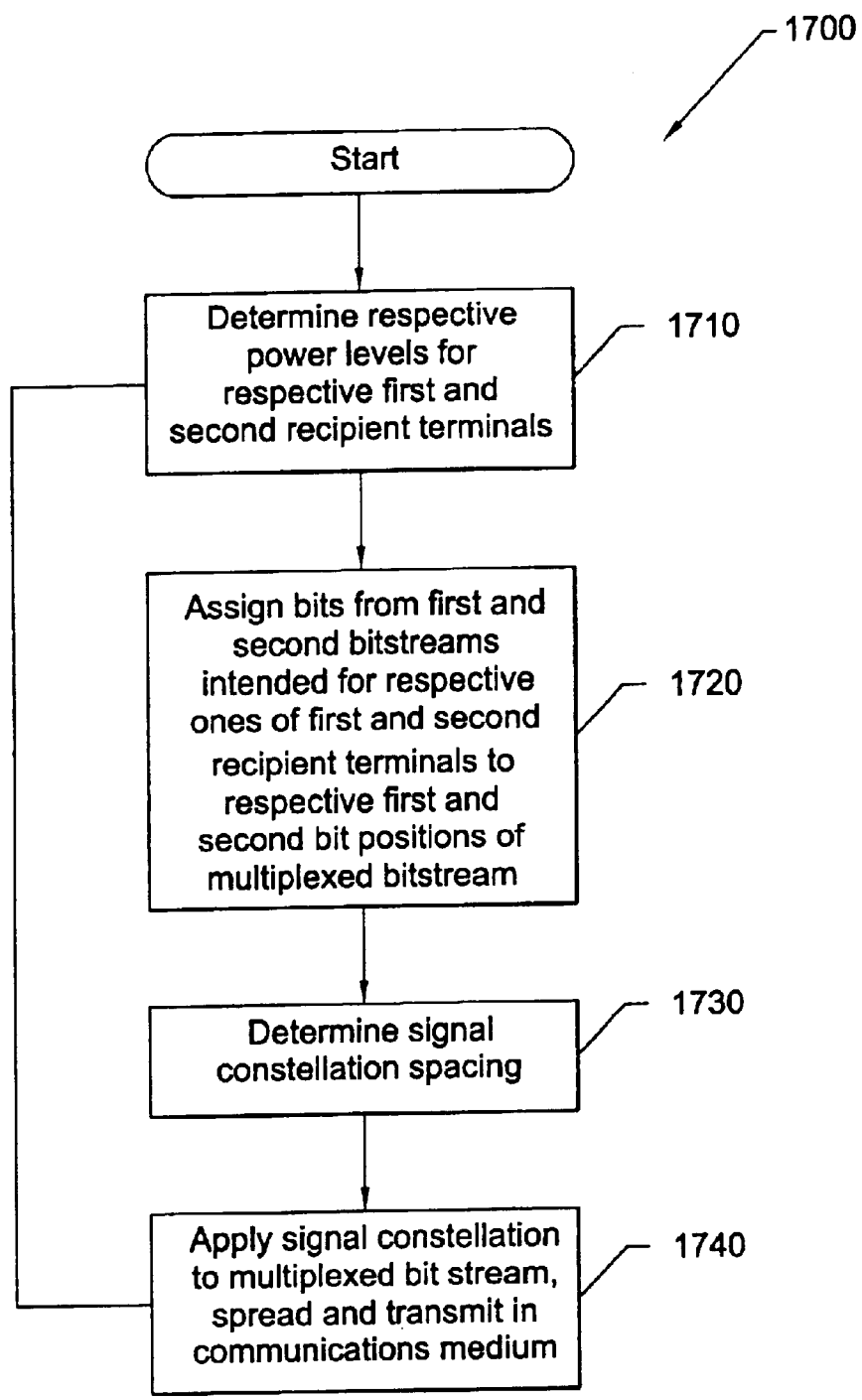
FIG. 17 is a flowchart illustrating exemplary operations according to embodiments of the present invention.

FIG. 17 illustrates exemplary operations 1700 for using such variably spaced and assigned signal constellations according to embodiments of the present invention. Respective first and second power levels are determined for respective first and second recipient terminals (Block 1710). Bits from first and second bitstreams intended for respective ones of the first and second recipient terminals are assigned to respective first and second bit positions in a multiplexed bitstream based on the determined first and second power levels (Block 1720). Spacing of the signal constellation to be applied to the multiplexed bitstream is determined based on the first and second power levels (Block 1730). The signal constellation is applied to the multiplexed bitstream, spread and transmitted in a communications medium (Block 1740). The above-described process can be recursively performed, e.g., the assignment and signal constellation adaptation operations (Blocks 1720, 1730) may be repeatedly performed based on new determinations of power levels (Block 1710).

Figure 18:
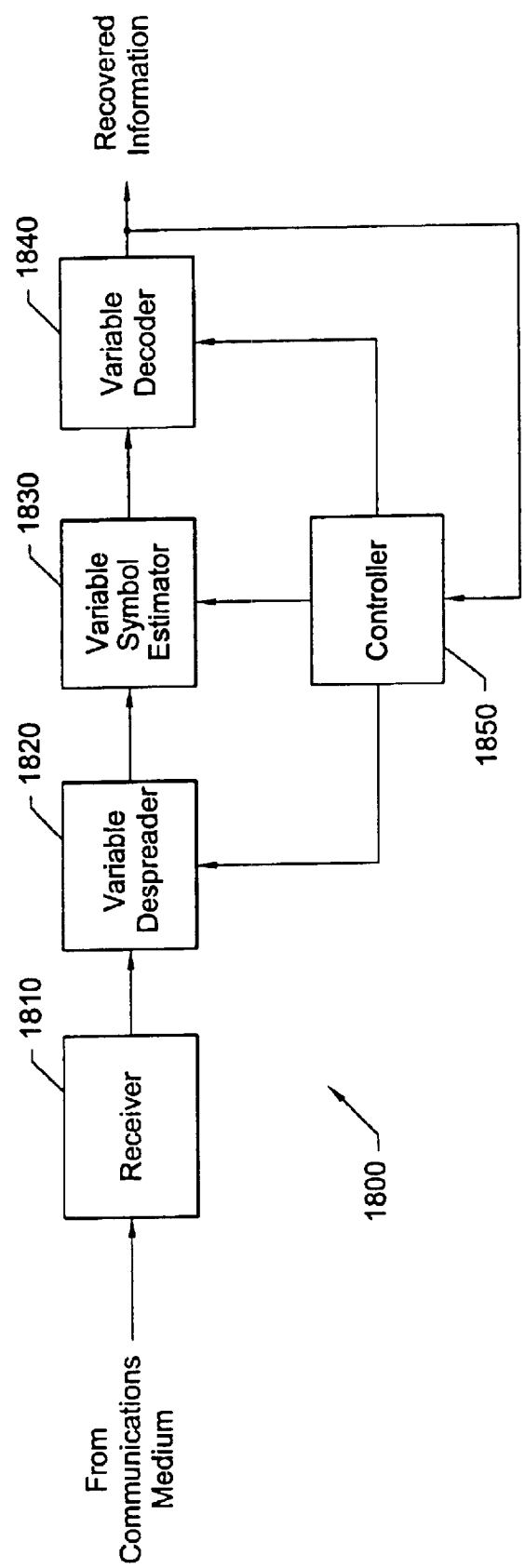
FIGS. 18–19 are block diagrams illustrating receiving stations according to embodiments of the present invention.

FIG. 18 illustrates a receiving station 1800 for processing signals from a communications medium that are transmitted by a communications system such as the communications systems described above. A receiver 1810, e.g., circuitry that performs such tasks as carrier demodulation, sampling and other functions, produces signal samples that are provided to a variable despreader 1820 that despreads the received signal samples according to a selected spreading code, producing despread symbol values that are provided to a variable symbol estimator 1830. The variable symbol estimator 1830 generates symbol estimates, which may be "hard" symbol values or uncategorized "soft values," to a variable decoder 1840. The variable decoder 1840 decodes the symbol estimates according to a selected combination of an error correction code and a signal constellation to recover information in the received signal. A controller 1850 controls the operations of the variable despreader 1820, the variable symbol estimator 1830 and the variable decoder 1840, e.g., selects which spreading code, signal constellation and error correction code are applied to be consistent with the spreading code, signal constellation and error correction code applied by the system that transmitted the received signal. It will be appreciated that a variety of techniques may be used to provide the controller 1850 with such information. For example, the controller 1850 may operate responsive to previously communicated information that indicates which spreading code, signal constellation and error correction code to use when processing a received signal.

Figure 19:
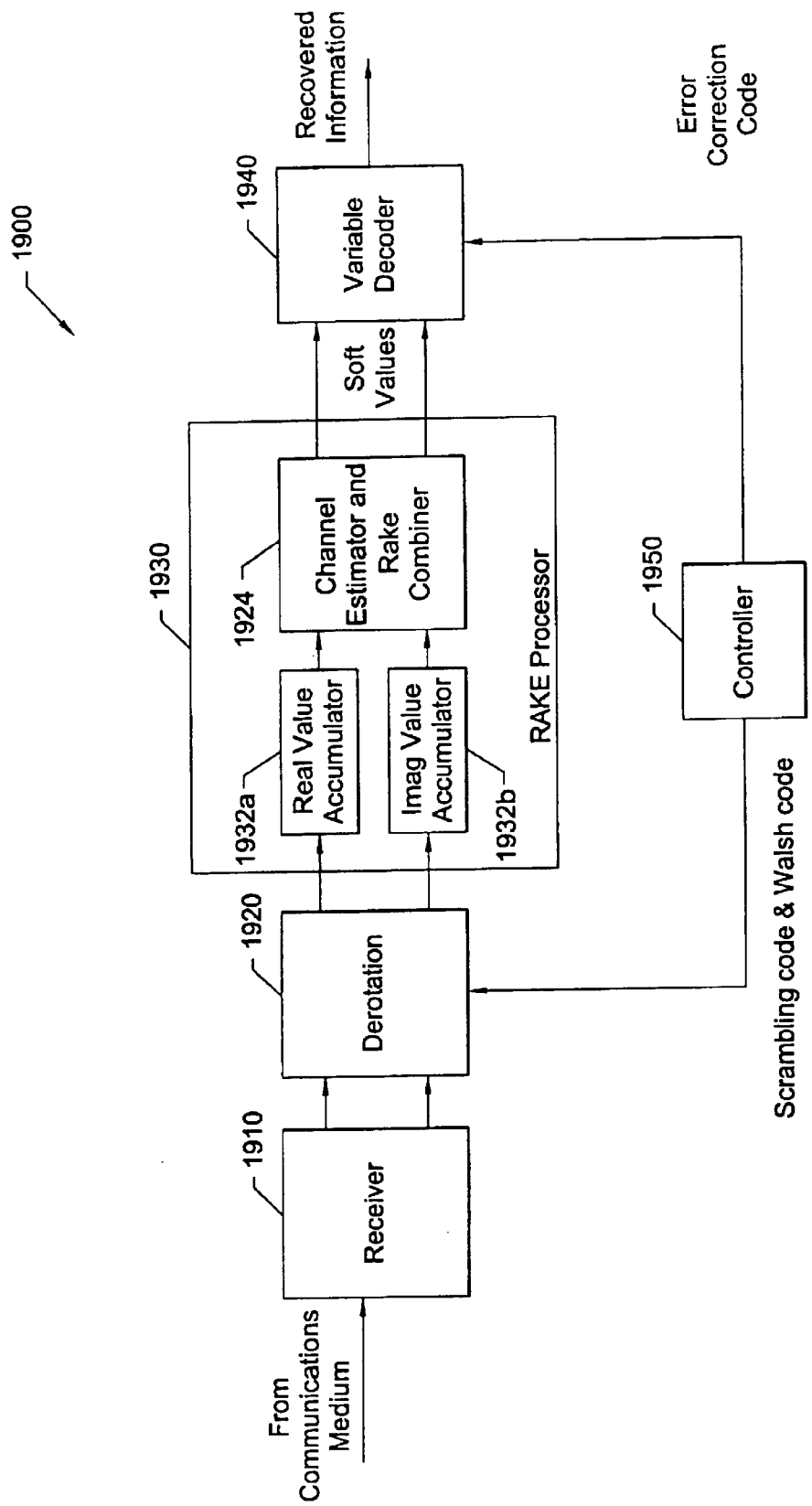

FIG. 19 illustrates a receiving station 1900 according to other embodiments of the present invention. A receiver 1910 receives a spread-spectrum communications signal from a communications medium, and produces complex baseband signal samples in a digital form suitable for numeric processing. The sampling rate may be one or more samples per chip. Suitable complex digitizing techniques that may be used to produce the complex digital signal samples include quadrature downconversion to in-phase (I) and quadrature (Q) channels by mixing with local sine and cosine reference signals, or quadrature sampling of an intermediate frequency signal using sample pairs spaced by an odd number of quarter cycles at the intermediate frequency. Alternatively, a log polar signal processing technique such as that described in U.S. Pat. No. 5,048,059 to Dent may be used, in which a first signal related to the logarithm of the instantaneous signal amplitude is digitized simultaneously with digitizing instantaneous phase-related values extracted from an amplitude-limited IF signal. The logpolar values may be converted to I and Q values using a logpolar to Cartesian conversion, e.g., by complex exponentiation or "antilog" operation using a look-up table.

A despreading derotator 1920 (e.g., a complex multiplier) derotates the phase angle of the received signal samples by the phase sequence imposed by spreading (e.g., orthogonal and scrambling code) by the transmitting system. The spreading code applied is selected by a controller 1940 based, for example, on knowledge of the code applied by the transmitting system communicated to the receiving station 1900. Derotation may be accomplished, in general, using a complex multiplier that multiplies the received signal samples by the conjugate of the spreading code used at the transmitting system. In this manner, the effect of a scrambling code and an orthogonal spreading code may be removed, such that the resulting derotated samples include N in-phase repeats of coded information symbols, where N is the spreading factor (i.e., the orthogonal code length in bits).

In a RAKE processor 1930, these symbol repeats are accumulated in real and imaginary accumulators 1932*a*, 1932*b*, to obtain complex despread coded symbol values. The accumulated values are periodically dumped into a RAKED combiner 1924, with the accumulators 1932*a*, 1932*b* being cleared with each dump to prepare for a next accumulation. The next accumulation may be an accumulation for that same coded symbol with a different time alignment between the signal samples and the spreading code (i.e., a different RAKE tap), which alignment maybe changed in steps of fractions of a symbol period in the case that the receiver 1910 digitizes received signals at a rate of multiple samples per chip. Alternatively, if the receiver 1910 digitizes at a rate of one sample per chip, alignment of the spreading code and the received signal samples may be changed in whole-chip increments. In other configurations (not shown), respective sets of accumulators may be used for different spreading code/signal sample alignments, as is known to those skilled in the art.

The despread accumulated values passed to the RAKE combiner 1924 may be processed according to any number of conventional RAKE combining techniques known to those skilled in the art. Despread values associated corresponding to known (e.g., pilot) symbols may be used to estimate the phase and amplitude of propagation paths corresponding to the different time alignments to obtain channel estimates, which generally are complex values. These channel estimates may then be used to obtain weighted complex values that are aligned in phase and amplitude weighted such that weak multipath rays contribute less than strong ones. The weighted accumulations may then be added to obtain complex coded symbol values. The symbol values produced by the RAKE combiner 1924 may be probabilistic soft values that have not been classified as members of a symbol alphabet ("hard symbols"). It will be appreciated that any of a number of different RAKE combining techniques may be used with the present invention, including those described in U.S. Pat. No. 5,151,919 to Dent, U.S. Pat. No. 5,218, 619 to Dent, U.S. Pat. No. 5,239,557 to Dent, U.S. Pat. No. 5,305,349 to Dent, U.S. Pat. No. 5,377,183 to Dent, U.S. Pat. No. 5,572,552 to Dent, U.S. Pat. No. 5,831,977 to Dent, U.S. Pat. No. 5,862,173 to Dent, U.S. Pat. No. 5,862,173 to Dent et al., and U.S. Pat. No. 5,944,774 to Dent, each of which is incorporated herein by reference in its entirety.

The variable decoder 1940 may be any of a number of different types of convolutional decoders, such as a Viterbi maximum likelihood sequence estimator (MLSE) or a Stack decoder. As discussed in detail below, the use of variable signal constellations according to aspects of the present invention can provide a way to avoid capacity limitations due to limits on the number of available orthogonal spreading codes and, accordingly, communications systems according to embodiments the present invention may be limited by signal to interference (C/I) requirements rather than code availability. Consequently, it may be advantageous for the variable decoder 1940, and the counterpart encoder used by the transmitting system, to use turbo codes or other high-performance codes that operate at a low energy-per-bit to noise density ratio ($E_b/N_o$). Such codes are described in IEEE Journal on Selected Areas in Communications, vol. 16, no. 2, 1998, which is hereby incorporated by reference herein.

Figure 20:
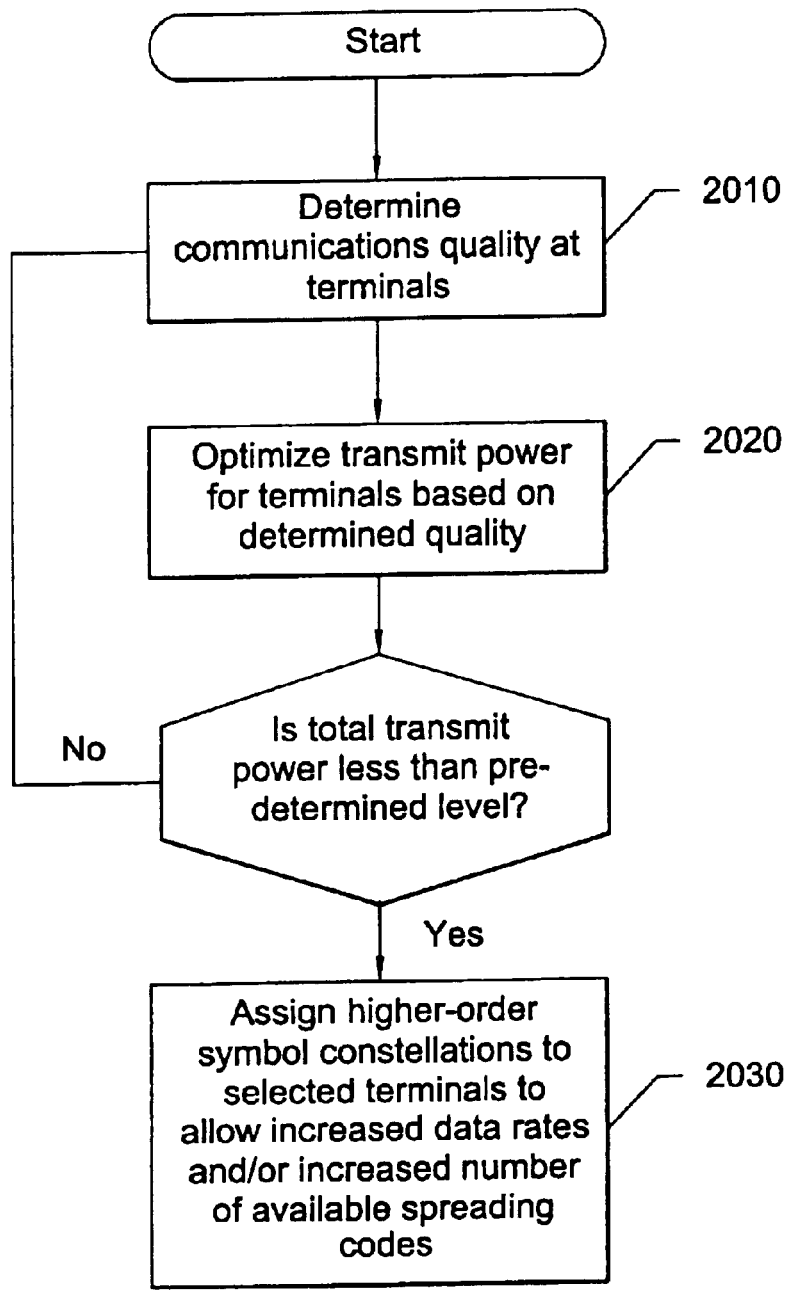
FIGS. 20–21 are flowcharts illustrating exemplary operations according to embodiments of the present invention.

FIG. 20 illustrates exemplary operations 2000 according to embodiments of the present invention. A communications system, such as a cellular network, determines quality of signals received at terminals (Block 2010), and optimizes transmit power for these terminals based on the determined signal transmission quality using, for example, a conventional power control technique (Block 2020). If the transmit power falls to predetermined level, e.g., if the total transmit power and/or mean transmit power are below predetermined maxima, the system may assign one or more selected terminals higher order signal constellations (Block 2030). This may enable the system to increase the data rate for such terminals and/or to increase the lengths of the spreading codes assigned to such users to increase the number of available spreading codes. For example, if there is a backlog of terminals waiting to be assigned channels, the system may make it a priority to provide additional spreading codes over providing increased information transmission rates. Alternatively, if a sufficient number of spreading codes is available, the system may make it a priority to increase information transmission rates for selected terminals, such as wireless terminals operating web browsers, multimedia or other applications that may benefit from increased information transmission rates, by decreasing the lengths of the spreading codes assigned to these terminals. Channel assignment could be prioritized such that the system seeks to accommodate the demanded number of channels as a first priority, and then maximizes the information transmission rates of selected users as a second priority.

Figure 21:
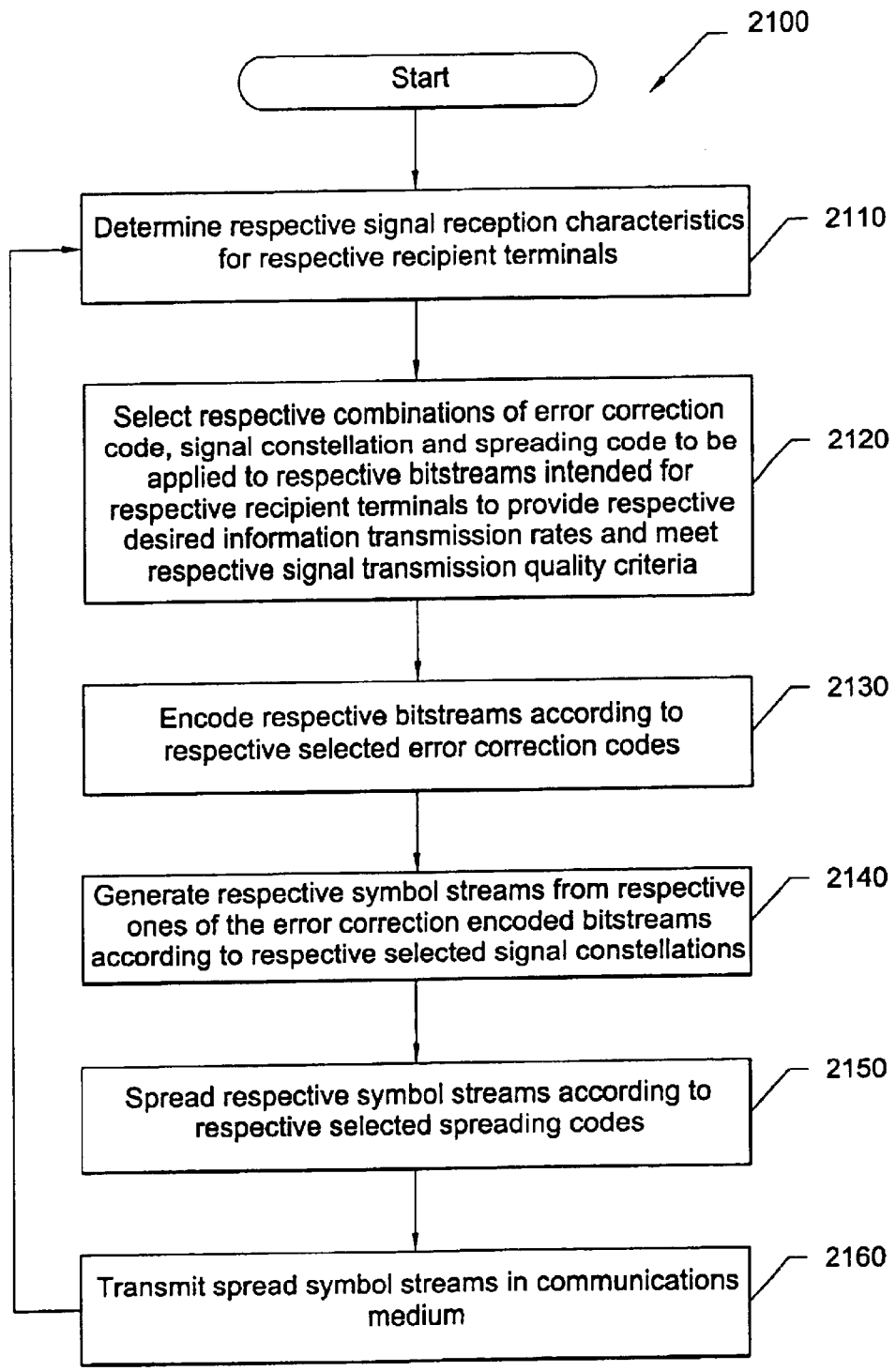

FIG. 21 illustrates exemplary operations 2100 for variably controlling the respective coding rates, signal constellations and spreading codes applied to respective bitstreams according to embodiments of the present invention. Respective signal reception characteristics are determined for respective intended recipients of respective ones of a plurality of bitstreams (Block 2110). Respective combinations of error correction code, signal constellation and spreading code to be applied to respective ones of the bitstreams are selected based on the determined signal reception characteristics in light of respective information transmission rate and signal transmission quality criteria (Block 2120). The respective bitstreams are encoded according to the respective selected error correction codes (Block 2130), and respective symbol streams are produced from the respective error correction encoded bitstreams according to the respective selected signal constellations (Block 2140). The symbol streams are then spread according to the respective selected spreading codes (Block 2150), and the spread symbol streams are transmitted (Block 2160). This process may be recursively repeated, with combinations of error correction code, signal constellation and spreading code being selected and applied (Blocks 2120–2160) based on new determinations of signal reception characteristics (Block 2110).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A communications system for communicating with a plurality of terminals, the system comprising:
   a network station;
   a variable error correction encoder that error correction encodes respective bitstreams for respective ones of the plurality of terminals according to respective selected coding rates of a plurality of coding rates;
   a variable symbol generator that maps respective ones of the error correction coded bitstreams to respective symbol streams according to respective signal constellations of a plurality of signal constellations of various orders;
   a variable spreader that spreads the respective symbol streams according to respective orthogonal spreading codes of a plurality of mutually orthogonal spreading codes of various lengths;
   a transmitter that transmits the spread symbol streams from the network station in a communications medium; and
   a controller, operatively associated with the variable error correction encoder, the variable symbol generator and the variable spreader, that selects respective combinations of coding rate, signal constellation and spreading code applied to the respective bitstreams such that the spread symbol streams transmitted from the network station are spread according to mutually orthogonal spreading codes.

2. The system of claim 1, wherein the controller selects the respective combinations of coding rate, signal constellation and spreading codes applied to the respective bitstreams such that each of the bitstreams is transmitted at an information transmission rate that is greater than or equal to a predetermined information transmission rate and with a signal transmission quality that meets a predetermined criterion.

3. The system of claim 2, wherein the controller selects the respective combinations of coding rate, signal constellation and spreading code applied to the respective bitstreams to maximize an information transmission rate for a selected terminal of the plurality of terminals.

4. The system of claim 1, wherein the controller selects the respective combinations of coding rate, signal constellation and spreading code applied to the respective bitstreams such that power for transmitting the plurality of spread symbol streams from the network station is less than a maximum total transmit power.

5. The system of claim 3, wherein the controller controls respective power levels at which the spread symbol streams are transmitted.

6. The system of claim 5, wherein the controller maximizes an information transmission rate for the selected terminal while maintaining a mean transmit power for the plurality of transmitted spread symbol streams at less than a maximum mean transmit power.

7. The system of claim 3, wherein the selected terminal comprises a web browser.

8. The system according to claim 1, wherein the variable error correction encoder comprises at least one of a convolutional encoder, a Trellis encoder, a serial concatenation of two encoders connected by an interleaver and a turbo encoder.

9. The system of claim 1, wherein the plurality of signal constellations comprises at least one of a QPSK constellation, an offset QPSK constellation, an M-PSK constellation, and an M-QAM constellation, wherein M is greater than or equal to eight.

10. The system of claim 1, wherein the plurality of orthogonal spreading codes comprises a plurality of Walsh-Hadamard codes.

11. The system of claim 1, wherein the variable spreader spreads the respective symbol streams according to respective combinations of an orthogonal spreading code of the plurality of orthogonal spreading code and a common scrambling code that is applied to each of the symbol streams.

12. The system of claim 11, wherein the plurality of orthogonal spreading codes comprises a plurality of Walsh-Hadamard codes.

13. The system of claim 11, wherein the common scrambling code comprises a sequence of QPSK symbols.

14. The system of claim 11, wherein respective ones of the combinations of orthogonal spreading code and the common scrambling code are respective multiplicative combinations, and wherein the variable spreader complex multiplies respective ones of the symbol streams by the respective multiplicative combinations such that one of four phase changes in steps of ninety degrees is provided for each symbol repeat produced.

15. The system of claim 1, wherein the variable spreader spreads respective ones of the symbol streams according to respective combinations of a Fourier code and a common scrambling code that is applied to each of the symbol streams, wherein the Fourier codes applied to the symbol streams are mutually orthogonal.

16. A communications system, comprising:
an error correction encoder that error correction encodes a bitstream according to an error correction code;
a variable symbol generator that generates a symbol from a group of bits of the error correction encoded bitstream according to a selected one of the plurality of selectable signal constellations;
a spreader that spreads the symbol according to a spreading code; and a transmitter that transmits the spread symbol in a communications medium.

17. The communications system of claim 16, wherein the plurality of selectable signal constellations includes at least two signal constellations of different order.

18. The communications system of claim 16, further comprising a controller, operatively associated with the variable symbol generator, that selects the signal constellation to provide a desired information transmission rate for the bitstream.

19. The communications system of claim 18, wherein the controller selects the signal constellation used by the variable symbol generator based on signal transmission quality.

20. A communication station according to claim 16, wherein the error correction encoder comprises a variable error correction encoder that encodes the bitstream according to a selected error correction code of a plurality of selectable error correction codes.

21. The communications system of claim 20, further comprising a controller, operatively associated with the variable error correction encoder and the variable symbol generator and the variable spreader, that selects the error correction code used by the variable error correction encoder and the signal constellation used by the variable symbol generator to provide a desired information transmission rate for the bitstream.

22. The communications system of claim 21, wherein the controller selects the error correction code used by the error correction encoder and the signal constellation used by the variable symbol generator based on signal transmission quality.

23. The communications system of claim 16:
wherein the error correction encoder comprises a variable error correction encoder that encodes the bitstream according to a selected error correction code of a plurality of selectable error correction codes; and
wherein the spreader comprises a variable spreader that spreads the symbol according to a selected spreading code of a plurality of selectable orthogonal spreading codes including at least two spreading codes of different lengths.

24. The communications system of claim 23, further comprising a controller, operatively associated with the variable error correction encoder, the variable symbol generator and the variable spreader, that selects the error correction code used by the variable error correction encoder, the signal constellation used by the variable symbol generator, and the spreading code used by the variable spreader to provide a desired information transmission rate for the bitstream.

25. The communications system of claim 24, wherein the controller selects the error correction code used by the error correction encoder, the signal constellation used by the variable symbol generator, and the spreading code used by the variable spreader based on signal transmission quality.

26. The communications system of claim 25, wherein the controller selects the error correction encoding rate used by the variable error correction encoder, the signal constellation used by the variable symbol generator and the spreading code used by the variable spreader such that an information transmission rate for the bitstream is greater than a predetermined information transmission rate and a signal transmission quality for the bitstream meets a predetermined criterion.

27. The communications system of claim 24:
wherein the bitstream comprises a plurality of bitstreams;
wherein the variable error detection encoder error correction encodes respective ones of the plurality of bitstreams according to respective selected error correction codes of the plurality of selectable error correction codes;
wherein the variable symbol generator produces respective symbol streams from respective ones of the error correction encoded bitstreams according to respective selected signal constellations of the plurality of selectable signal constellations;
wherein the variable spreader spreads respective ones of the symbol streams according to respective selected spreading codes of the plurality of selectable spreading codes; and
wherein the controller selects respective combinations of error correction code, signal constellation and spreading code applied to the respective bitstreams of the plurality of bitstreams such that an information transmission rate for a first bitstream exceeds a first minimum required information transmission rate associated with the first bitstream while an information transmission rate for a second bitstream is maintained at or above a second minimum required information transmission rate associated with the second bitstream.

28. The communications system of claim 27, wherein the controller selects respective combinations of error correction code, signal constellation and spreading code applied to the respective bitstreams of the plurality of bitstreams such that the information transmission rate for the first bitstream is maximized.

29. The communications system of claim 28, wherein the controller controls respective power levels at which respective ones of the plurality of bitstreams are transmitted.

30. The communications system of claim 29, wherein the controller selects respective combinations of error correction code, signal constellation and spreading code applied to the respective bitstreams of the plurality of bitstreams such that the information transmission rate for the first bitstream is maximized while maintaining a desired transmit power level for the plurality of bitstreams.

31. The communications system of claim 24:
wherein the bitstream comprises a plurality of bitstreams;
wherein the variable error detection encoder error correction encodes respective ones of the plurality of bitstreams according to respective selected error correction codes of the plurality of selectable error correction codes;
wherein the variable symbol generator produces respective symbol streams from respective ones of the error correction encoded bitstreams according to a respective selected signal constellation of the plurality of selectable signal constellations;
wherein the variable spreader spreads respective ones of the symbol streams according to respective combinations of an orthogonal spreading code of a set of orthogonal-spreading codes and a common scrambling code; and wherein the controller selects respective combinations of error correction encoding rate, the signal constellation and orthogonal spreading code applied to the respective bitstreams of the plurality of bitstreams.

32. The communications system of claim 31, wherein the set of orthogonal spreading codes comprises a set of Walsh-Hadamard codes.

33. The communications system of claim 31, wherein the set of orthogonal spreading codes comprises a set of Fourier codes.

34. The communications system of claim 16, wherein the variable symbol generator produces respective symbols from the selected signal constellation from respective groups of bits of the encoded bitstream such that a first bit position of the successive groups of bits correlates to clusters of signal plane constellation points of the selected signal constellation and a second bit position of the successive groups correlates to relative positions within the clusters of constellation points.

35. The communications system of claim 34, further comprising means for determining respective first and second desired power levels for respective first and second recipients of information in respective ones of the first and second bit positions, and wherein the variable symbol generator controls spacing of the clusters of constellation points in the signal plane based on the determined first and second desired power levels.

36. The communications system of claim 34, further comprising:
means for determining respective first and second desired power levels for respective first and second recipients; and
means for assigning respective ones of the first and second bit positions to respective ones of the first and second recipients based on the determined first and second desired power levels.

37. The communications system of claim 16, wherein the spreader comprises a multiplier that receives the symbol from the variable symbol generator and multiplies the received symbol by the spreading code to produce the spread symbol.

38. The communications system of claim 37, wherein the spreader further comprises a second multiplier that multiplies an orthogonal spreading code by a scrambling code to produce the spreading code.

39. The communications system of claim 16, wherein the spreader comprises:
an orthogonal spreader that receives the symbol from the variable spreader and orthogonally spreads the received symbol according to a spreading code selected from a set of orthogonal spreading codes; and
a scrambler that receives the orthogonally spread symbol and scrambles the orthogonally spread symbol according to a scrambling code to produce the spread symbol.

40. The communications system of claim 16:
wherein the spreader comprises an orthogonal spreader that orthogonally spreads the error correction encoded bitstream according to a spreading code selected from a set of orthogonal spreading codes;
wherein the variable symbol generator produces the symbol from the selected constellation from a group of bits of the orthogonally-spread error correction encoded bitstream; and
wherein the spreader further comprises a scrambler that receives the symbol produced by the variable symbol generator and scrambles the received symbol according to a scrambling code to produce the spread symbol.

41. The communications system of claim 16:
wherein the spreader comprises an orthogonal spreader that orthogonally spreads the error -correction encoded bitstream according to a selected orthogonal spreading code of a set of orthogonal spreading codes; and
wherein the plurality of selectable constellations includes at least one constellation that maps complementary bit patterns to diametrically opposite constellation points in a complex plane.

42. The communications system of claim 41, wherein the spreader modulo-2 adds successive bits of the orthogonal spreading code to successive groups of bits of the error correction encoded bitstream.

43. The communications system of claim 16, wherein the variable error correction encoder comprises at least one of a convolutional encoder, a Trellis encoder, a turbo encoder, and a serial concatenation of a first error correction encoder, an interleaver and a second error correction encoder.

44. The communications system of claim 16, wherein the plurality of selectable signal constellations comprises at least one of a QPSK constellation, an 8-PSK constellation, an M-ary PSK constellation, and a M-ary QAM constellation.

45. A communications system, comprising:
an error correction encoder that encodes a bitstream according to an error correction code;
a symbol generator that generates respective symbols according to a signal constellation from respective groups of bits of the encoded bitstream such that a first bit position of the groups of bits correlates to clusters of signal plane constellation points of the signal constellation and a second bit position of the groups of bits correlates to relative positions within the clusters of constellation points;
a spreader that spreads the symbols produced by the symbol generator; and
a transmitter that transmits the spread symbols in a communications medium.

46. The communications system of claim 45, further comprising means for determining respective first and second desired power levels for respective first and second recipients of information in respective ones of the first and second bit positions, and wherein the symbol generator controls spacing of the clusters of constellation points in the signal plane based on the determined first and second desired power levels.

47. The communications system of claim 45, further comprising:
means for determining respective first and second desired power levels for respective first and second recipients; and
means for assigning respective ones of the first and second bit positions to respective ones of the first and second recipients based on the determined first and second desired power levels.

48. (Previously Presented) A receiving station, comprising:
a receiver that receives a communications signal from a communications medium;
a despreader that despreads the received signal according to a spreading code;
a symbol estimator that generates a symbol estimate from the despread signal; and
a variable decoder that decodes the symbol estimate according to a selected combination of an error correction code and a signal constellation of a plurality of selectable signal constellations.

49. The receiving station of claim 48, wherein the plurality of selectable signal constellations comprises at least two signal constellations of different orders.

50. The receiving station of claim 49, wherein the variable decoder decodes the symbol estimate according to a selected error correction code of a plurality of error correction codes including at least two error correction codes of different rates.

51. The receiving station of claim 48, wherein the despreader comprises a variable despreader that despreads the received signal according to a selected spreading code of a plurality of selectable spreading codes including at least two spreading codes of different lengths.

52. The receiving station of claim 48, wherein the variable decoder comprises at least one of a Trellis decoder, a Viterbi decoder, and a turbo decoder.

53. The receiving station of claim 48, wherein the symbol estimator comprises a RAKE combiner.

54. The receiving station of claim 48, wherein the despreader comprises a complex multiplier.

55. A method of communicating a bitstream, comprising:
modulo-2 adding each bit of a binary spreading code of length N in turn to a first group of bits of the bitstream to generate a revised first group of bits;
generating a first symbol from the revised first group of bits using a signal constellation that maps the first group of bits and a complement of the first group of bits to diametrically opposite constellation points;
transmitting the first symbol in a communications medium;
translating a second group of bits of the bitstream to the first group of bits;
modulo-2 adding each bit of a binary spreading code of length N in turn to the translated second group of bits to generate a revised translated second group of bits;
generating a second symbol from the revised translated second group of bits using the signal constellation that maps the first group of bits and a complement of the first group of bits to diametrically opposite constellation points; and
transmitting the second symbol in the communications medium.

56. The method of claim 55, wherein translating the second group of bits to the first group of bits comprises translating the second group of bits to the first group of bits by cross-reference to a look-up table.

57. The method of claim 55:
wherein transmitting the first symbol in a communications medium is preceded by scrambling the first symbol according to a scrambling code; and
wherein transmitting the first symbol in a communications medium comprises transmitting the scrambled first symbol in the communications medium.

58. The method of claim 57, wherein the scrambling code comprises a complex sequence.

59. The method of claim 58, wherein the complex sequence comprises binary-valued real and imaginary components.

60. The method according to claim 57, wherein scrambling the first symbol according to a scrambling code comprises multiplying the first symbol by a scrambling sequence value.

61. A method of applying spreading codes to a signal using multi-bit complex symbols of a complex signal constellation, the constellation including at least one sub-group of constellation points that are equally-spaced in angle over 360 degrees by a given angular increment, the method comprising:
selecting a sequence of N phase rotation values from a set of phase rotations substantially equally spaced over 360 degrees by the angular increment to form a phase-rotational spreading code;
generating groups of bits for transmission to be represented by the multi-bit complex symbols using a bit-to-symbol mapping in which no sub-group of bits forming a symbol has an arithmetic value indicative of the angular position of the symbol;
translating respective ones of the generated groups of bits to respective bit patterns using a one-to-one mapping such that given sub-groups of bits in the bit patterns have an arithmetic value indicative of the angular position of the symbol; and
modifying the given subgroups in the bit patterns using each of the sequence of N phase rotation values to form, for each bit pattern, N rotated symbols.

62. The method of claim 61, wherein the signal constellation comprises a 16-QAM constellation in which the at least one sub-group of equally spaced constellation points comprises four subgroups angularly spaced at 90 degree intervals.

63. The method of claim 61, wherein the one-to-one mapping comprises a lookup table.

64. In a CDMA communications system employing orthogonal spreading codes, a method of controlling use of the orthogonal spreading codes, comprising:
selecting a group of recipients to share one of the orthogonal spreading codes;
representing respective groups of sequential bits for respective ones of the group of recipients by respective multi-bit symbols of a signal constellation;
repeating a respective one of the multi-bit symbols using the corresponding group of bits a respective number of times associated with the respective recipient; and
scrambling the repeated multi-bit symbols according to an orthogonal spreading code selected from a set of orthogonal spreading codes.

65. The method of claim 64, wherein the numbers of times each group of bits is used to form symbols for each of the group of recipients is the same.

66. A method of communicating, comprising:
error correction encoding respective ones of a plurality of bitstreams according to respective error correction codes;
generating respective symbol streams from respective ones of the respective encoded bitstreams according to respective signal constellations of a plurality of signal constellations, wherein the plurality of signal constellations comprises at least two signal constellations of different order;
spreading respective ones of the symbol streams according to respective spreading codes; and
transmitting the spread symbol streams in a communications medium.

67. The method of claim 66, further comprising selecting a signal constellation for application to a bitstream of the plurality of bitstreams to provide a desired information transmission rate for the bitstream.

68. The method of claim 66, further comprising selecting a signal constellation applied to a bitstream based on signal transmission quality.

69. The method of claim 66, wherein the plurality of error correction codes includes at least two codes of different rates.

70. The method of claim 69, further comprising selecting the error correction codes and signal constellation applied to a bitstream to provide a desired information transmission rate for the bitstream.

71. The method of claim 70, further comprising selecting the error correction code and the signal constellation applied to a bitstream based on signal transmission quality.

72. The method of claim 66, wherein the plurality of spreading codes comprises a plurality of spreading codes including at least two spreading codes of different lengths.

73. The method of claim 72, further comprising selecting the error correction code, signal constellation and the spreading code applied to a bitstream to provide a desired information transmission rate for the bitstream.

74. The method of claim 72, further comprising selecting the error correction code, signal constellation and spreading code applied to a bitstream based on signal transmission quality.

75. The method of claim 72, further comprising selecting the error correction encoding rate, signal constellation and spreading code applied to a bitstream such that an information transmission rate for the bitstream is greater than a predetermined information transmission rate and a signal transmission quality for the bitstream meets a predetermined criterion.

76. The method of claim 72, further comprising selecting respective combinations of error correction code, signal constellation and spreading code applied to the respective bitstreams of the plurality of bitstreams such that the information transmission rate for a bitstream is maximized.

77. The method of claim 76, further comprising controlling respective power levels at which respective ones of the plurality of bitstreams are transmitted.

78. The method of claim 77, further comprising selecting respective combinations of error correction code, signal constellation and spreading code applied to the respective bitstreams of the plurality of bitstreams such that the information transmission rate for a first bitstream is maximized while maintaining a desired transmit power level for the plurality of bitstreams.

79. The method of claim 66, wherein spreading respective ones of the symbol streams according to respective spreading codes comprises spreading respective ones of the symbol streams according to respective combinations of an orthogonal spreading code of a set of orthogonal spreading codes and a common scrambling code.

80. The method of claim 79, wherein the set of orthogonal spreading codes comprises a set of Walsh-Hadamard codes.

81. The method of claim 80, wherein the set of orthogonal spreading codes comprises a set of Fourier codes.

82. A method according to claim 66, wherein generating respective symbol streams from respective ones of the respective encoded bitstreams according to respective signal constellations of a plurality of signal constellations comprises producing respective symbols from a signal constellation from respective groups of bits of an encoded bitstream such that a first bit position of the successive groups of bits correlates to clusters of signal plane constellation points of the selected signal constellation and a second bit position of the successive groups correlates to relative positions within the clusters of constellation points.

83. The method of claim 82, further comprising:
determining respective first and second desired power levels for respective first and second recipients of information in respective ones of the first and second bit positions; and
controlling spacing of the clusters of constellation points in the signal plane based on the determined first and second desired power levels.

84. The method of claim 82, further comprising:
determining respective first and second desired power levels for respective first and second recipients; and
assigning respective ones of the first and second bit positions to respective ones of the first and second recipients based on the determined first and second desired power levels.

85. The method of claim 66:
wherein spreading respective ones of the symbol streams according to respective spreading codes comprises orthogonally spreading an error -correction encoded bitstream according to an orthogonal spreading code of a set of orthogonal spreading codes; and
wherein generating respective symbol streams from respective ones of the respective encoded bitstreams according to respective signal constellations of a plurality of signal constellations comprises generating a symbol stream from the orthogonally spread error correction encoded bitstream according to a signal constellation that maps complementary bit patterns to diametrically opposite constellation points in a complex plane.

86. The method of claim 85, wherein spreading respective ones of the symbol streams according to respective spreading codes comprises modulo-2 adding successive bits of the orthogonal spreading code to successive groups of bits of the error correction encoded bitstream.

87. The method of claim 66, wherein the plurality of error correction codes comprise at least one of a convolutional code, a Trellis code, a turbo code, and a serial concatenation of a first error correction code, interleaving and a second error correction code.

88. The method of claim 66, wherein the plurality of signal constellations comprises at least one of a QPSK constellation, an 8-PSK constellation, an M-ary PSK constellation, and a M-ary QAM constellation.

89. A method of communicating a bitstream, comprising:
error correction encoding the bitstream according to an error correction code;
generating respective symbols according to a signal constellation from respective groups of bits of the encoded bitstream such that a first bit position of the groups of bits correlate to clusters of constellation points of the signal constellation and a second bit position of the groups of bits correlate to relative positions within the clusters of constellation points;
spreading the generated symbols; and
transmitting the spread symbols in a communications medium.

90. The method of claim 89, further comprising:
determining respective first and second desired power levels for respective first and second recipients of information in respective ones of the first and second bit positions; and
controlling spacing of the clusters of constellation points in the signal plane based on the determined first and second desired power levels.

91. The method of claim 89, further comprising:
determining respective first and second desired power levels for respective first and second recipients; and assigning respective ones of the first and second bit positions to respective ones of the first and second recipients based on the determined first and second desired power levels.

92. A method of processing received signals, comprising:
despreading first and second received signals according to respective first and second spreading codes;
generating respective first and second symbol estimates from the respective first and second despread first and second received signals;
decoding the first symbol estimate according to a combination of a first error correction code and a first signal constellation; and
decoding the second symbol estimate according to a second combination of a second error correction code and a second signal constellation.

93. The method of claim 92, wherein the first and second signal constellations are of different orders.

94. The method of claim 93, wherein the first and second error correction codes have different rates.

95. The method of claim 92, wherein the first and second spreading codes have different lengths.

* * * * *

UNITED STATES PATENT AND TRADEMARK OFFICE
CERTIFICATE OF CORRECTION

PATENT NO. : 6,934,317 B1
DATED : August 23, 2005
INVENTOR(S) : Paul W. Dent

It is certified that error appears in the above-identified patent and that said Letters Patent is hereby corrected as shown below:

Column 34,
Line 58, please delete "(Previously Presented)".

Signed and Sealed this

Eleventh Day of October, 2005

JON W. DUDAS
*Director of the United States Patent and Trademark Office*